(12) United States Patent
Bassett et al.

(10) Patent No.: US 7,135,113 B2
(45) Date of Patent: Nov. 14, 2006

(54) KEYED FILTER ASSEMBLY

(75) Inventors: Laurence W. Bassett, Killingworth, CT (US); William Contaxis, III, Milford, CT (US); Bruce G. Taylor, Kensington, CT (US); David A. Carbo, East Haddam, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/753,894

(22) Filed: Jan. 8, 2004

(65) Prior Publication Data
US 2004/0144713 A1 Jul. 29, 2004

Related U.S. Application Data

(60) Division of application No. 10/208,492, filed on Jul. 30, 2002, now abandoned, which is a continuation of application No. 09/553,982, filed on Apr. 20, 2000, now Pat. No. 6,458,269.

(51) Int. Cl.
B01D 27/08 (2006.01)
B01D 27/10 (2006.01)

(52) U.S. Cl. ........................ 210/232; 210/443
(58) Field of Classification Search ................ 210/117, 210/119, 232, 234, 235, 248, 249, 287, 288, 210/418, 440, 443, 444; 285/362, 377, 914
See application file for complete search history.

(56) References Cited

U.S. PATENT DOCUMENTS

| 3,746,171 | A | * | 7/1973 | Thomsen ............... 210/234 |
|---|---|---|---|---|
| 4,515,692 | A | | 5/1985 | Chandler et al. |
| 4,645,601 | A | | 2/1987 | Regunathan et al. |
| 4,731,183 | A | | 3/1988 | Schumacher, II |
| 4,735,716 | A | | 4/1988 | Petrucci et al. |
| 4,806,240 | A | | 2/1989 | Giordano et al. |
| 4,857,189 | A | | 8/1989 | Thomsen et al. |
| 4,859,328 | A | * | 8/1989 | Groezinger et al. ........ 210/232 |
| 4,904,382 | A | | 2/1990 | Thomsen |
| 4,956,086 | A | | 9/1990 | Thomsen et al. |
| 5,035,797 | A | | 7/1991 | Janik |
| RE34,031 | E | | 8/1992 | Thomsen et al. |
| 5,180,015 | A | | 1/1993 | Ringgenberg et al. |
| 5,186,829 | A | | 2/1993 | Janik |
| 5,354,464 | A | | 10/1994 | Slovak et al. |
| 5,486,288 | A | | 1/1996 | Stanford et al. |
| 5,560,824 | A | | 10/1996 | Sann et al. |
| 5,766,463 | A | | 6/1998 | Janik et al. |
| 5,826,854 | A | | 10/1998 | Janvrin et al. |
| 5,837,137 | A | | 11/1998 | Janik |
| 2001/0030148 | A1 | | 10/2001 | Knight |

FOREIGN PATENT DOCUMENTS

DE 40 21 790 1/1992
EP 0 395 197 10/1990

(Continued)

Primary Examiner—Matthew O. Savage
(74) Attorney, Agent, or Firm—R. Thomas Payne

(57) ABSTRACT

A filter assembly is disclosed including a cartridge member having a body portion and a cylindrical neck portion depending from the body portion, the neck portion having at least one lug depending radially outwardly therefrom having a keyed surface formation thereon, and a reception member defining an axial bore for receiving the neck portion of the cartridge member, the bore having at least one reception area provided therein for receiving the at least one lug, the reception area having a compatible mating surface formation defined therein for engaging the keyed surface formation on the lug so as to prevent engagement with an incompatible cartridge member.

20 Claims, 15 Drawing Sheets

| | FOREIGN PATENT DOCUMENTS | | WO | WO 97 45362 | 12/1997 |
|----|----|----|----|----|----|
| EP | 0 580 501 | 1/1994 | | | |
| WO | WO 94 02407 | 2/1994 | * cited by examiner | | |

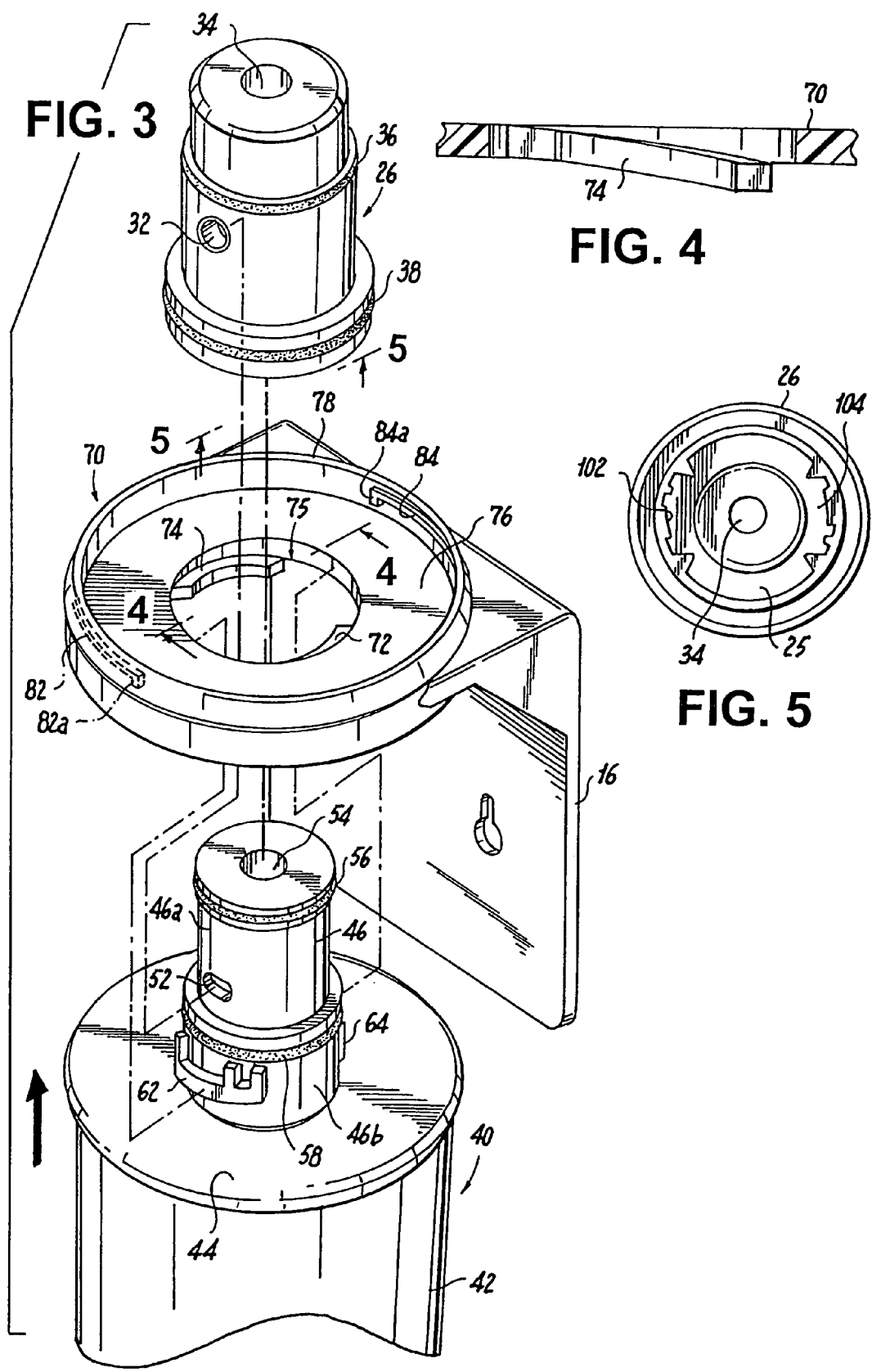

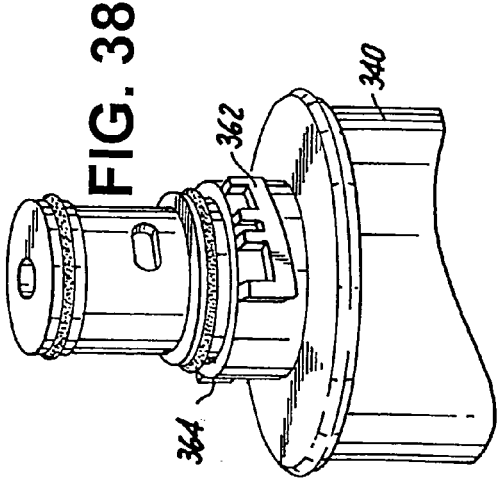
FIG. 37
FIG. 38
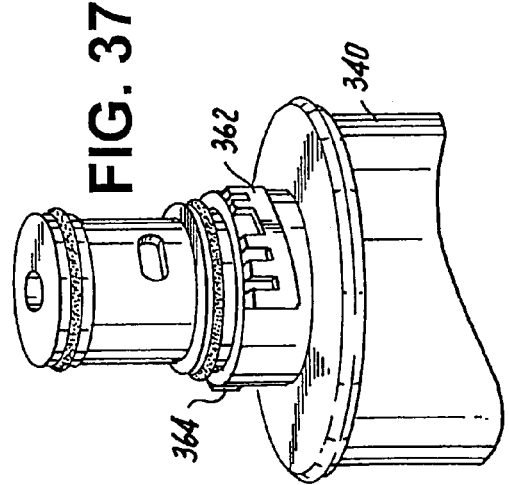
FIG. 36
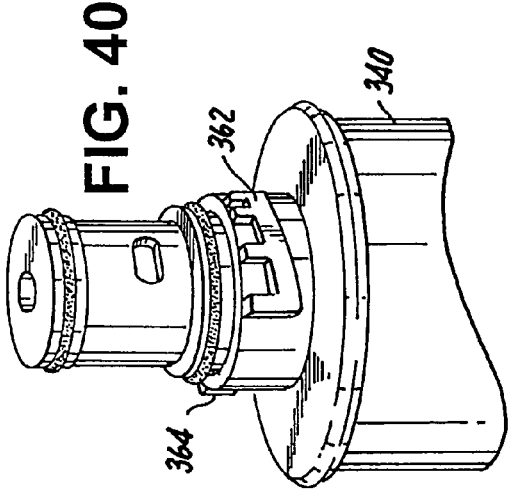
FIG. 40
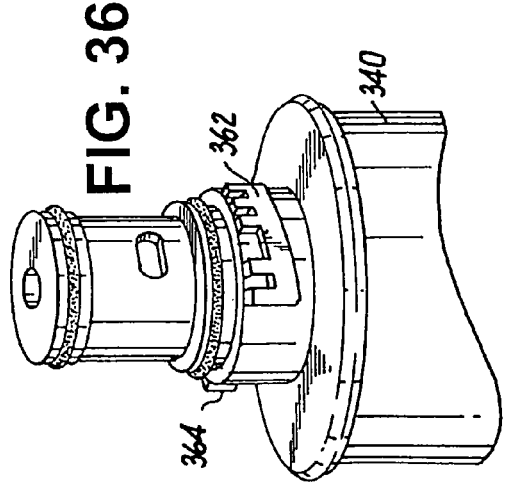
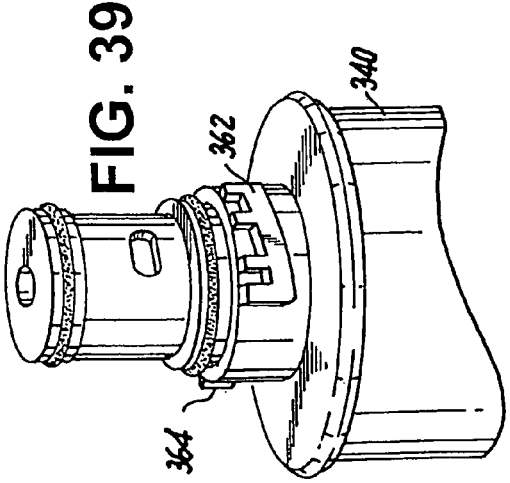
FIG. 39

FIG. 45
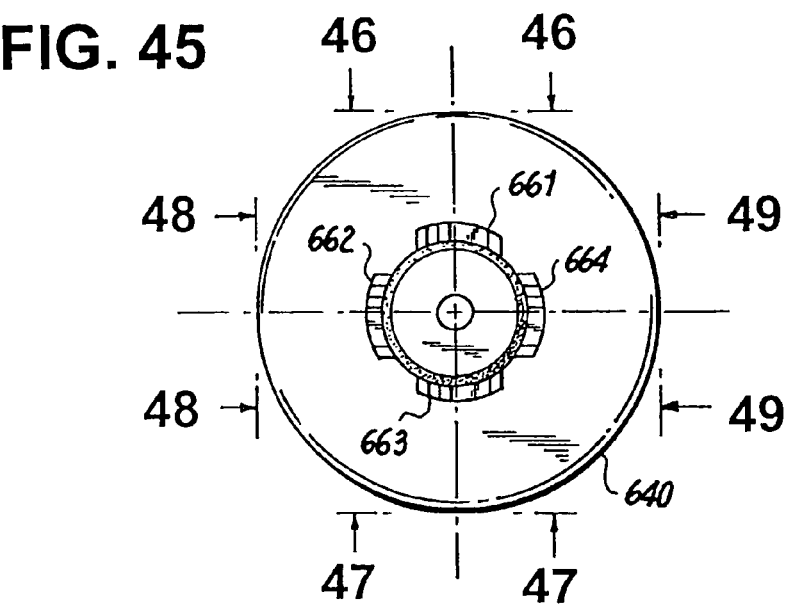
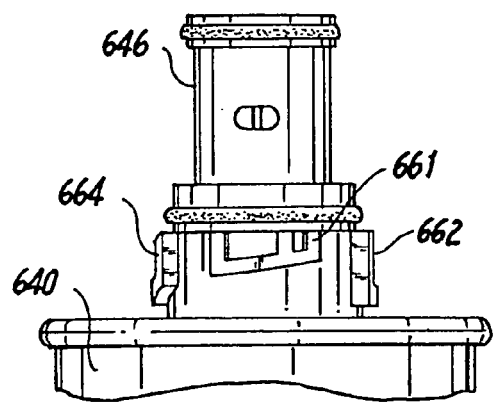
FIG. 46
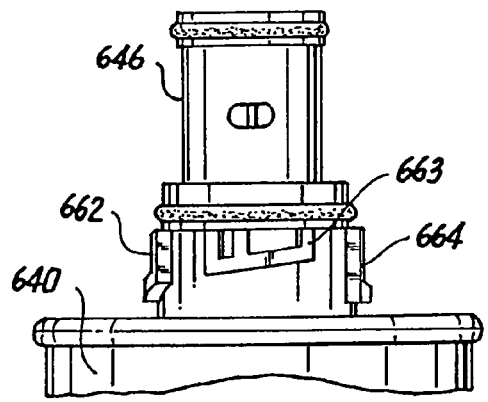
FIG. 47
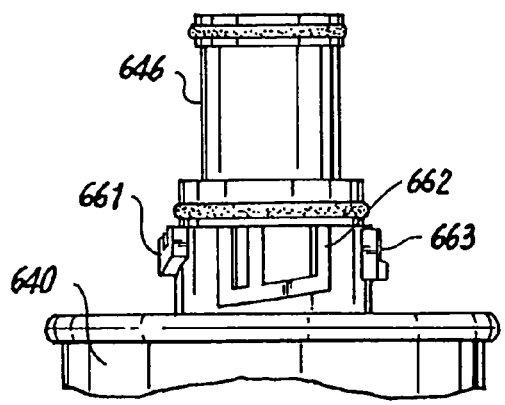
FIG. 48
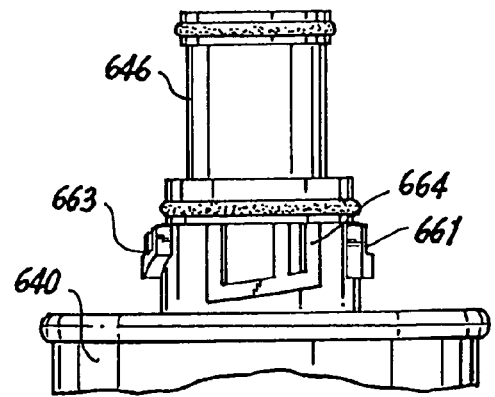
FIG. 49

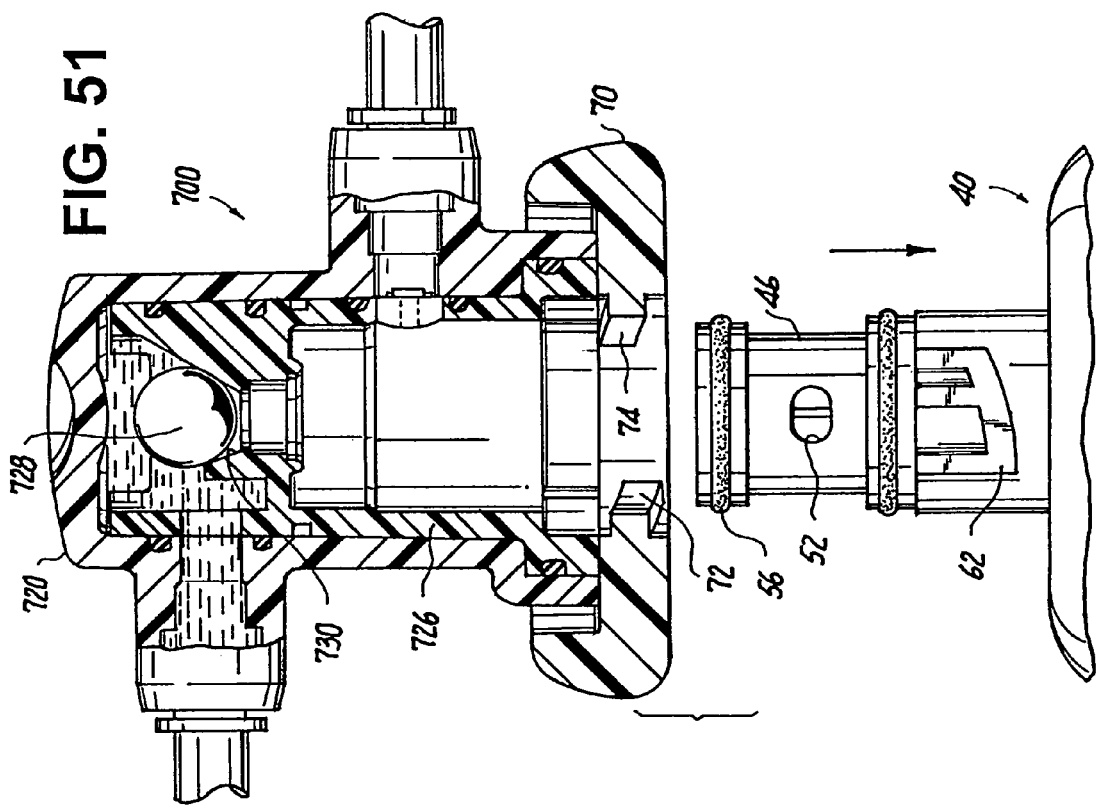
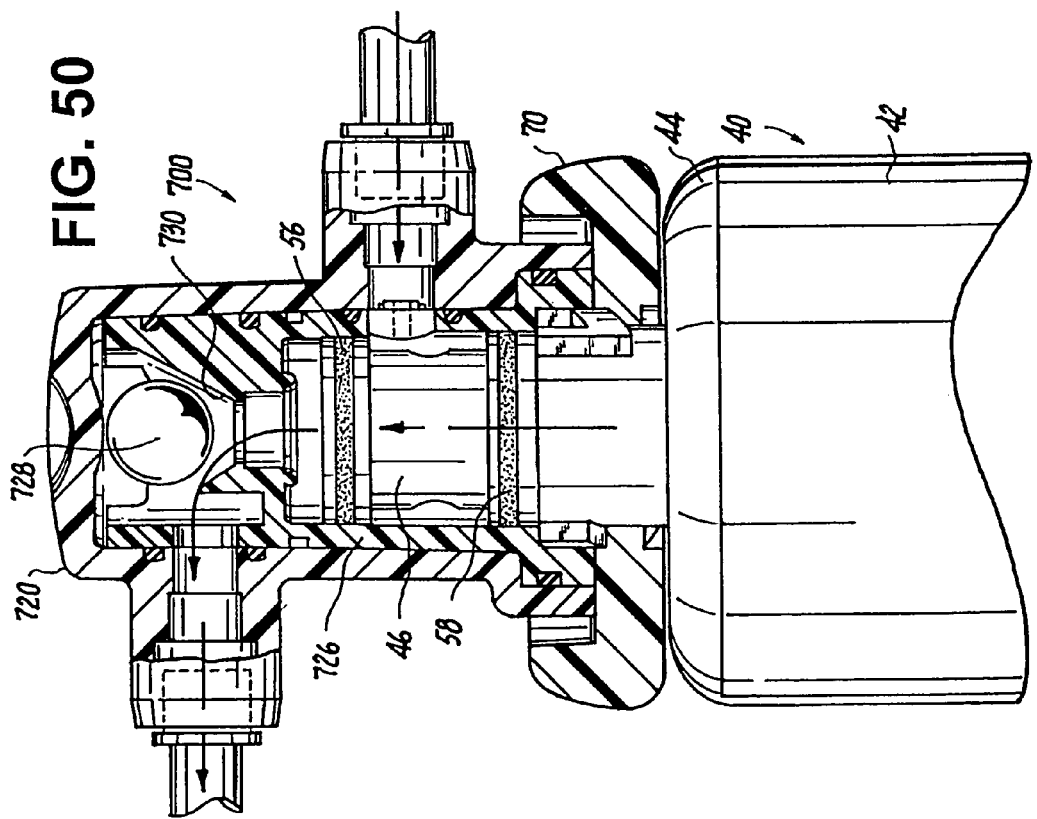

KEYED FILTER ASSEMBLY

The subject application is a divisional of Ser. No. 10/208,492 filed Jul. 30, 2002, now abandoned, which is a continuation of U.S. application Ser. No. 09/553,982 filed Apr. 20, 2000, now U.S. Pat. No. 6,458,269, and are hereby incorporated by reference.

BACKGROUND OF THE INVENTION

1. Field of the Invention

The subject invention relates to fluid filtration devices, and more particularly, to a filter assembly having a keyed lockout system to ensure replacement cartridge compatibility.

2. Background of the Related Art

Commercial vending machines for dispensing liquids such as coffee or soft drinks are wide spread in our society. It is common to filter liquids such as water in these vending machines before they are dispensed by circulating the water through an appropriate filter. It is also commonplace to find filtering devices in consumer appliances such as refrigerators for filtering drinking water and for ice production. Commercial and domestic filtering devices of this type have a limited useful life and require frequent replacement. Examples of prior art replaceable filtering devices of this type are disclosed in commonly assigned U.S. Pat. No. 4,735,716 to Petrucci et al. and U.S. Pat. No. 4,806,240 to Giordano et al.

In most instances, the replaceable filters employed in commercial and consumer appliances are manufactured in accordance with particular design specifications and performance parameters provided by the appliance manufacturer. In many cases, the filter media used in such filters consists of a proprietary material or is manufactured using a proprietary process. Thus, appliance manufactures often recommend that replacement cartridges be purchased from the original equipment provider so as to ensure the integrity and proper operation of the filtering system.

Oftentimes, the owner of a household appliance or the maintenance personnel servicing a commercial vending machine is not aware of the replacement filter specifications and operating parameters of the filtering system. Consequently, they unknowingly jeopardize the integrity of the filtration system by replacing a used filter with an inferior or incompatible replacement filter supplied by an after-market manufacturer. This problem has also been encountered by automotive filter manufacturers, as inferior replacement fuel filters are frequently installed in a vehicle without the knowledge of the vehicle owner or operator.

One solution to this problem is disclosed in U.S. Pat. No. 5,035,797 to Janik, wherein a key system is provided to ensure replacement cartridge compatibility for axially mounted fuel filters with threaded retaining collars. The key system employs a unique matrix of axially projecting keys formed in a base for axially receiving a filter cartridge, and a corresponding matrix of slots formed in a compatible cartridge, so that for a given compatible cartridge and base, the keys are interlockable in the slots to securely lock the cartridge in the base. For each non-compatible cartridge and base, the base keys are not-mateable with the cartridge slots and interfere with the mounting of the cartridge to the base. A similar key system is disclosed in U.S. Pat. No. 5,186,829 to Janik which includes a set of angularly spaced arcuate projections that protrude radially from the cylindrical side wall of the fuel filter cartridge to mate with corresponding spaced apart recesses in the base when the cartridge is axially pushed into the base. U.S. Pat. No. 5,837,137 to Janik discloses yet another key system for an axially mounted fuel filter with a threaded retaining collar.

While such prior art key systems are suitable for use in conjunction with axially mountable automotive fuel filters having threaded retaining collars, they are not easily adapted for use in conjunction with consumer and industrial water filtration systems wherein the filter cartridge is provided with a set of cam lugs configured to facilitate rotatable mounting of the cartridge to a base or supporting structure. Examples of prior art filter cartridges having lugged engagement portions are disclosed in the Petrucci et al. and Giordano et al. patents discussed hereinabove, and in U.S. Pat. Nos. 4,857,189 and 4,956,086 to Thomsen et al. It would beneficial to provide a key system for replaceable filter cartridges having lugged mounting systems.

SUMMARY OF THE INVENTION

The subject invention is directed to a unique filter assembly for ensuring replacement cartridge compatibility in filtration systems having replaceable filter cartridges with lugged mounting systems. In accordance with a preferred embodiment of the subject invention, the filter assembly comprises a cartridge member including a body portion and a cylindrical neck portion which depends from the body portion. The neck portion has a pair of diametrically opposed lugs depending radially outwardly therefrom, wherein each lug has an engagement surface defining a keyed surface formation. The neck portion has an inlet passage for delivering fluid into the body portion and an outlet passage for delivering fluid from the body portion.

The filter assembly further comprises a head member defining an axial bore and having a fluid inlet port to accommodate the ingress of fluid into the axial bore and a fluid outlet port to accommodate the egress of fluid from the axial bore. A rotary valve member is disposed within the axial bore of the head member and defines an axial bore for receiving the neck portion of the cartridge member. The axial bore of the valve member has a pair of diametrically opposed reception areas defined therein for receiving the lugs of the neck portion. Each reception area has a mating surface defining a keyed surface formation adapted and configured to mate with the keyed surface formation of a corresponding lug of a compatible filter cartridge. In addition, the valve member has an inlet orifice for communicating with the inlet port of the head member and an outlet orifice for communicating with the outlet port of the head member when the lugs of the neck portion are engaged with the reception areas of the valve member and the valve member is rotated into an operational position.

The filter assembly further comprises a support member disposed between the valve member and the cartridge member. The support member has an aperture extending therethrough for receiving and retaining the neck portion of the cartridge member and a seating area for receiving and retaining the head member. Preferably, each lug includes an inclined cam surface on a lower portion thereof for cooperating with a pair of diametrically opposed cam ramps projecting into the aperture of the support member. In use, rotation of the cartridge member relative to the support member effectuates rotational movement of the valve member relative to the head member.

In accordance with a preferred embodiment of the subject invention, the keyed surface formation on each lug includes a plurality of spaced apart tooth positions each for accommodating an axially projecting tooth, and the recessed areas include a series of spaced apart recesses for mating with the axially projecting teeth of a compatible filter cartridge. Alternative keyed surface formations and corresponding reception areas are also envisioned and are disclosed herein.

The subject invention is also directed to a filter assembly that comprises a filter cartridge including a body portion and a cylindrical neck portion depending from the body portion, wherein the neck portion has at least one lug depending radially outwardly therefrom having a keyed surface formation thereon, and a reception member defining an axial bore for receiving the neck portion of the cartridge member, the bore having at least one reception area provided therein for receiving the at least one lug, wherein the reception area has a compatible mating surface formation defined therein for engaging the keyed surface formation on the lug so as to prevent engagement with an incompatible filter cartridge. The reception member is preferably defined by a rotary valve disposed within an interior bore of a housing member or an annular insert disposed within an interior bore of a housing member.

In accordance with a preferred embodiment the subject invention, there is also disclosed a filter cartridge system that comprises a set of filter cartridges each including a cylindrical neck portion, the neck portion of each filter cartridge in the set having at least one lug depending therefrom with a keyed surface formation thereon to enable the cartridge to mate with a compatible reception member, wherein each filter cartridge in the set has a different keyed surface formation thereon.

These and other unique features of the lenticular filter cartridge assembly of the subject invention and the method of constructing the same will become more readily apparent from the following description of the drawings taken in conjunction with the detailed of the preferred embodiments.

BRIEF DESCRIPTION OF THE DRAWINGS

So that those having ordinary skill in the art to which the subject invention appertains will more readily understand how to construct and use the filter cartridge assembly of the subject invention, reference may be had to the drawings wherein:

FIG. 3 is an enlarged perspective view of the upper portion of the filter assembly of FIG. 1 including the filter cartridge, support bracket and head member;

FIG. 4 is a cross-sectional view of the support bracket shown in FIG. 3 taken along line 4—4 of FIG. 3 illustrating the ramped camming surface formed thereon;

FIG. 5 is bottom end view of the valve member shown in FIG. 3 as viewed along line 5—5 of FIG. 3;

FIGS. 28–40 illustrate each of the available key patterns for a camming lug having a maximum of six teeth positions;

FIG. 45 is a top plan view of the neck portion of a filter cartridge constructed in accordance with a preferred embodiment of the subject invention which includes two sets of diametrically opposed camming lugs positioned at two different levels on the neck portion of the cartridge;

FIG. 46 is a side elevational view of the neck portion of the filter cartridge of FIG. 45, taken along line 46—46;

FIG. 47 is a side elevational view of the neck portion of the filter cartridge of FIG. 45, rotated 90° from the view shown in FIG. 46;

FIG. 48 is a side elevational view of the neck portion of the filter cartridge of FIG. 45, rotated 90° from the view shown in FIG. 47;

FIG. 49 is a side elevational view of the neck portion of the filter cartridge of FIG. 45, rotated 90° from the view shown in FIG. 48;

FIG. 50 is a side elevational view in cross-section, of another filter assembly constructed in accordance with a preferred embodiment of the subject invention wherein a ball valve is positioned within the assembly to inhibit the egress of fluid from the system when the filter cartridge is removed from the assembly, with the ball valve shown in an open position;

FIG. 51 is a side elevational view in cross-section, of the filter assembly of FIG. 50 with the ball valve shown in a closed position as the filter cartridge is removed from the assembly;

These and other features of the filter assembly of the subject invention will become more readily apparent to those having ordinary skill in the art form the following detailed description of the preferred embodiments.

DETAILED DESCRIPTION OF THE PREFERRED EMBODIMENTS

Figure 1:
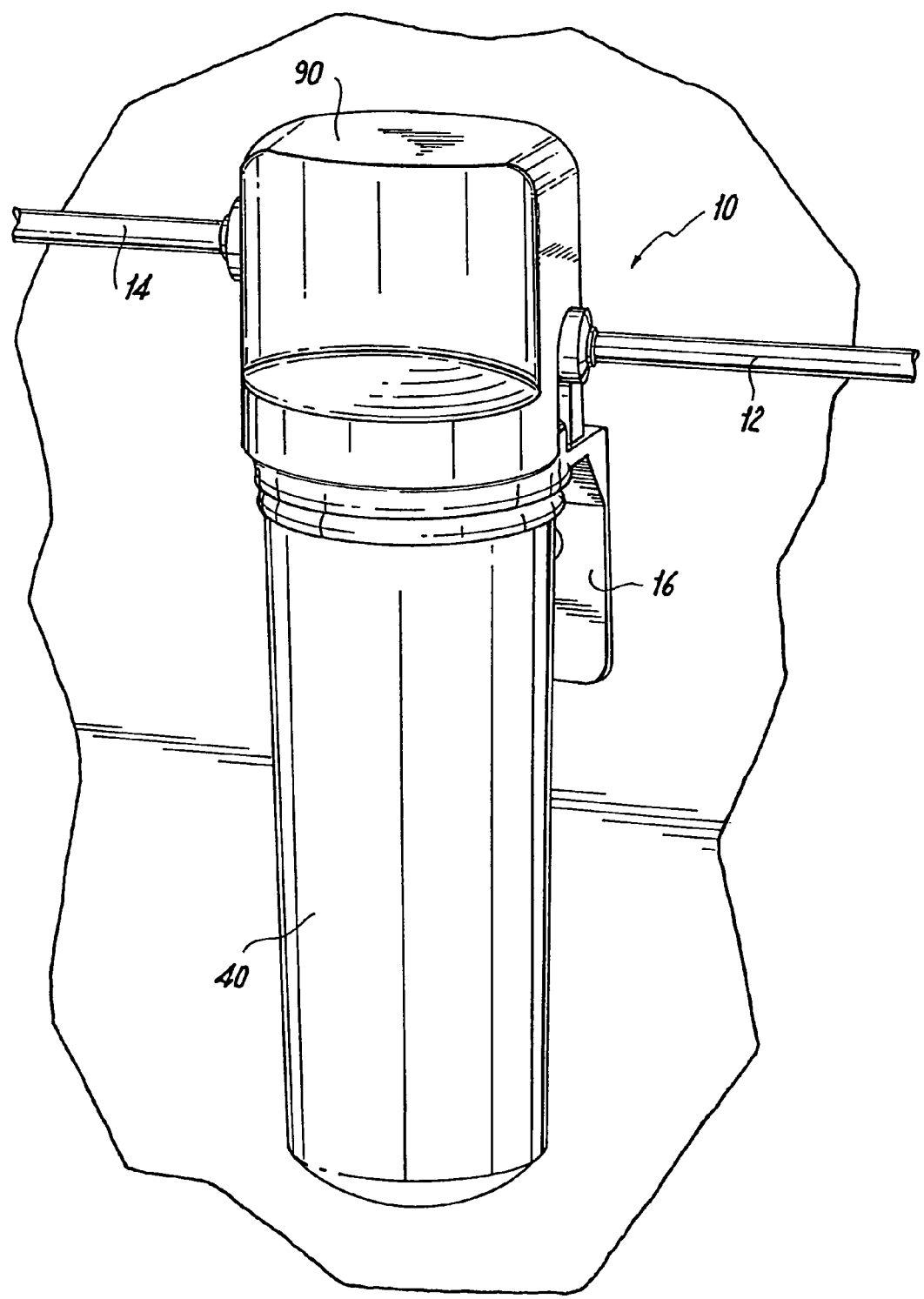
FIG. 1 is a perspective view of a filter assembly constructed in a accordance with a preferred embodiment of the subject invention.

Referring now to the figures wherein like reference numerals identify similar structural elements of the filter assembly of the subject invention, there is illustrated in FIG. 1 a filter assembly constructed in accordance with a preferred embodiment of the subject invention and designated generally by reference numeral 10. Filter assembly 10 is configured for use in conjunction with a fluid processing system that includes an inlet conduit 12 for delivering unfiltered process fluid into the filter assembly and an outlet conduit 14 for delivering filtered process fluid from the filter assembly 10. Filter assembly 10 is preferably mounted to a supporting structure associated with the fluid processing system by a bracket 16.

Figure 2:
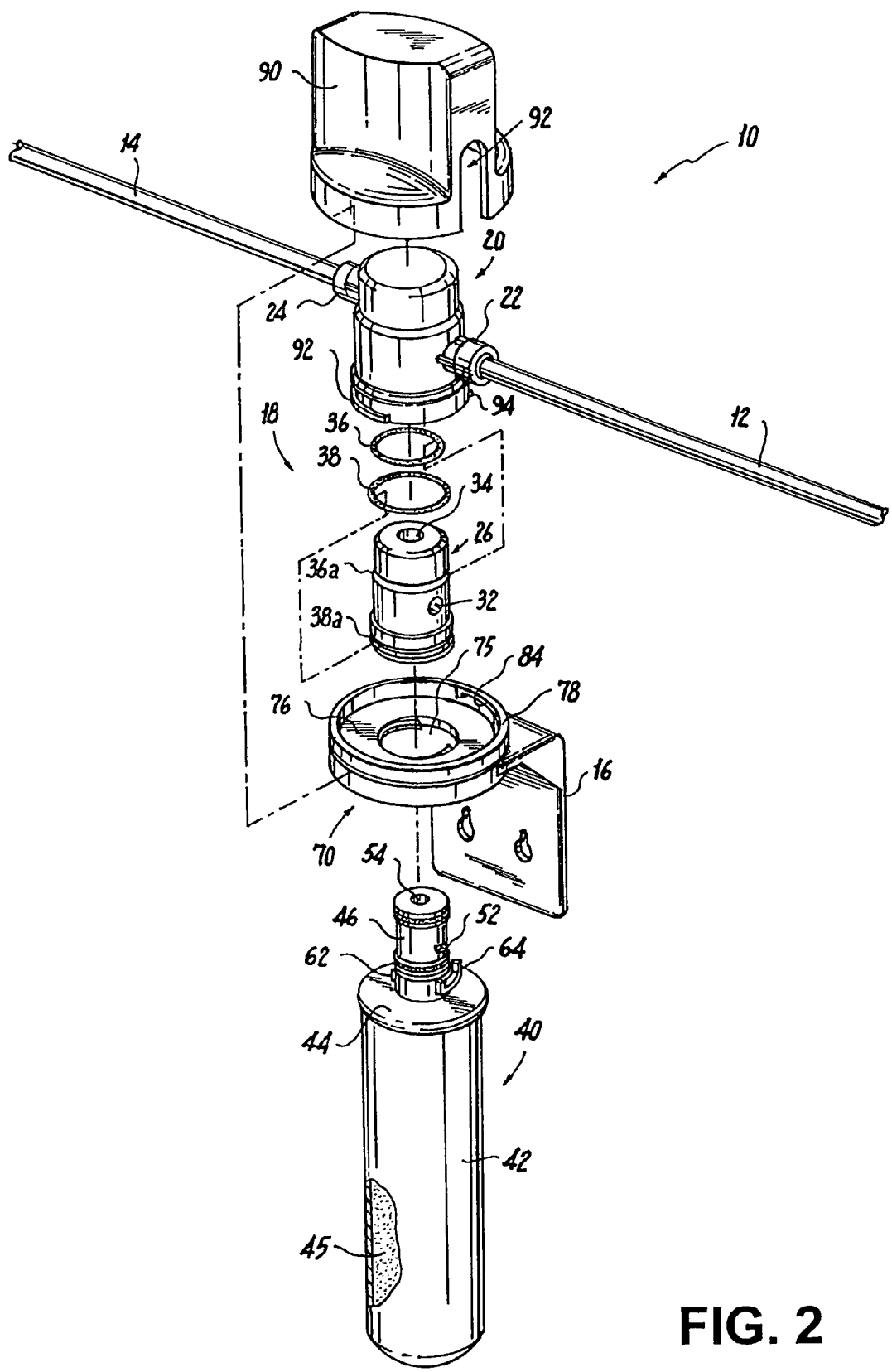
FIG. 2 is an exploded perspective view of the filter assembly of FIG. 1 with part separated for ease of illustration.

Referring to FIG. 2, filter assembly 10 includes a unique rotary valve assembly 18 that consists of a head portion 20 defining an interior chamber having an inlet port 22 for communicating with inlet conduit 12 and an outlet port 24 for communicating with outlet conduit 14. Rotary valve assembly 18 further includes a valve member 26 configured for reception within the interior chamber of head portion 20 in such a manner so as to facilitate rotation of the valve member relative to the head portion between an open position wherein fluid is permitted to flow through the filter assembly and a closed position wherein flow through the filter assembly is restricted. (See FIGS. 10–11).

Figure 6:
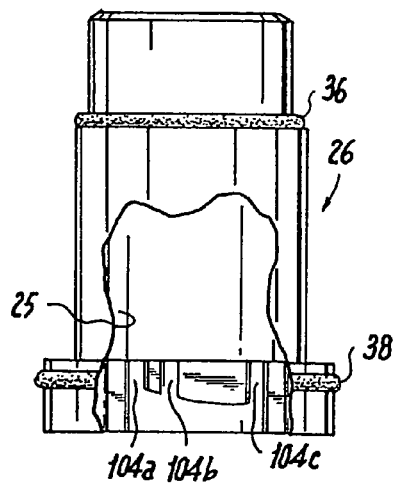
FIG. 6 is an elevational view of the valve member of FIG. 3, with a portion of the outer wall broken away to illustrate interior surface features thereof.
Figure 7:
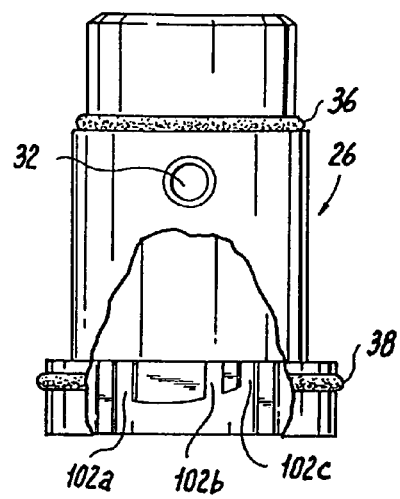
FIG. 7 is an elevational view of the valve member of FIG. 3, with a portion of the outer wall broken away and rotated 180° from the position shown in FIG. 6 to illustrate interior surface features thereof.
Figure 8:
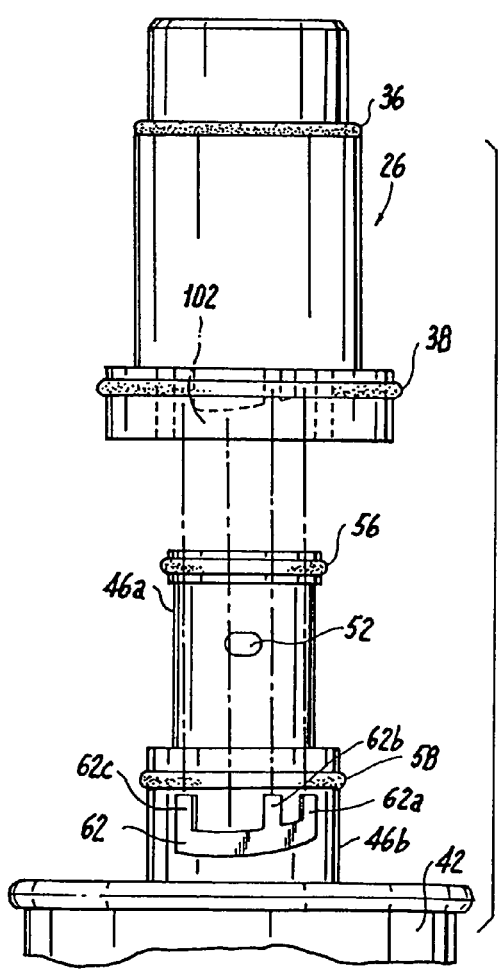
FIG. 8 is an elevational view of the upper portion of the filter cartridge and the valve member of FIG. 3, with the interlocking features thereof in axial alignment to facilitate the engagement therebetween.
Figure 9:
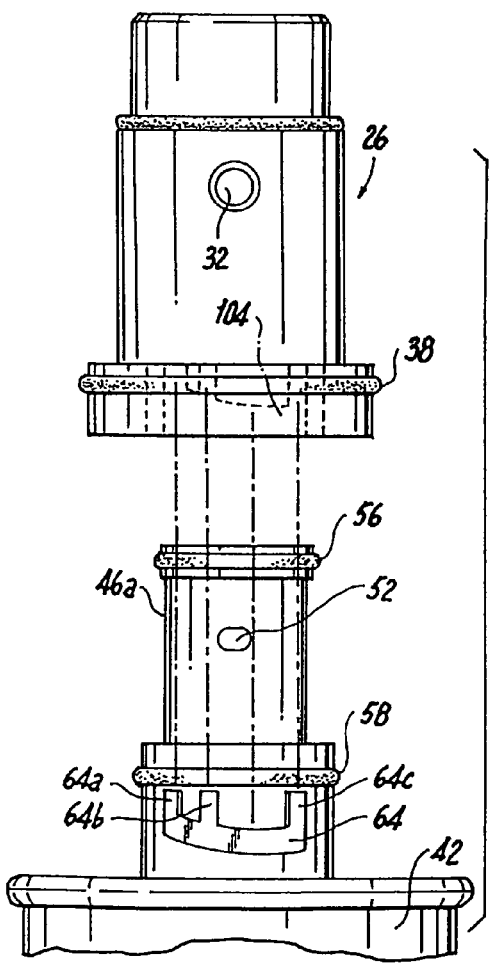
FIG. 9 is an elevational view of the upper portion of the filter cartridge and the head member of FIG. 3, rotated 180° from the position shown in FIG. 8, with the interlocking features thereof in axial alignment to facilitate the engagement therebetween.

Valve member 26 includes an inlet orifice 32 for communicating with the inlet port 22 of head portion 20 and an outlet orifice 34 for communicating with the outlet port 24 of head portion 20. (See FIGS. 6–7). The body of valve member 26 includes recesses 36a and 38a for accommodating upper and lower O-ring seals 36 and 38. O-ring seal 36 serves to sealingly isolate the inlet flow from the outlet flow within the interior chamber of head portion 20 during operation, while O-ring seal 38 prevents leakage to atmosphere.

With continuing reference to FIG. 2, filter assembly 10 further includes a replaceable filter cartridge 40 constructed in accordance with a preferred embodiment of the subject invention. Filter assembly 10 is adapted and configured to ensure that replacement cartridge 40 is compatible with the fluid processing system with which it is associated. Moreover, as discussed hereinbelow, the filter cartridge 40 and head portion 20 are provided with keyed mating structures that ensure compatibility therebetween, and thus prevent the accidental or intentional installation of an incompatible or inferior replacement cartridge, which could jeopardize the integrity of the fluid processing system.

Referring to FIG. 3, replaceable filter cartridge 40 includes a generally cylindrical body portion 42 enclosing filter media for filtering process fluid. Those skilled in the art will readily appreciate that any one of a variety of different types of filter media could be enclosed within the body portion including, for example, pleated media, micro-fibers or carbon media. An end cap 44 encloses the body portion 42, and a cylindrical neck portion 46 depends from the end cap 44. Those skilled in the art will readily appreciate that the end cap 44 and body portion 42 can be joined together by sonic welding, spin welding or other similar methods known in the art. Accordingly, the body portion and the neck portion are operably connected such that one is not separable from the other. The neck portion 46 of filter cartridge 40 is adapted and configured for reception with the interior cavity of valve member 26 (see FIGS. 6–9) and includes an upper section 46a and a lower portion 46b.

The upper section 46a defines a radial inlet passage 52 for receiving unfiltered process fluid entering the valve member 26 through inlet orifice 32 and directing the fluid into the body portion 42 of filter cartridge 40. The upper section 46a further defines an axial outlet passage 54 for delivering filtered process fluid from the interior of body portion 42 to the interior cavity of valve member 26 for egress through the outlet orifice 34 into the interior chamber of head portion 20. Those skilled in the art will readily appreciate that the inlet and outlet passages in the neck portion could be reversed such that the inlet flow is axial and the outlet flow is radial. The inlet and outlet passages 52 and 54 are sealingly isolated from one another by an upper O-ring seal 56 positioned at the upper end of neck portion 46. A second lower O-ring seal 58 is positioned below the radial inlet passage 52 to sealingly engage the neck portion 46 within the interior chamber of the valve member 26 and prevent the leakage of unfiltered process fluids from filter assembly 10 while in operation.

Referring to FIG. 2 in conjunction with FIG. 3, a pair of diametrically opposed inclined cam lugs 62 and 64 project radially outwardly from the lower section 46b of neck portion 46. Cam lugs 62 and 64 are dimensioned and configured to facilitate rotational engagement of the filter cartridge within an intermediate support flange 70 that depends from mounting bracket 16. As best seen in FIG. 3, a central aperture 75 extends through support flange 70 for receiving the neck portion 46 of filter cartridge 40. A pair of diametrically opposed cam ramps 72 and 74 project radially into central aperture 75 for interacting with the inclined lower surfaces of cam lugs 62 and 64 that are axially spaced from the body portion and face toward the body portion in a generally axial direction. The cam ramps 72 and 74 are spaced from one another to allow the cam lugs 62 and 64 to fit therebetween when the neck portion is extended through aperture 75 during assembly, and they are inclined along their arc length to facilitate rotational engagement of the filter cartridge with support flange 70, as illustrated in FIG. 4.

Referring to FIGS. 2 and 3, support flange 70 further includes a recessed seating area 76 defined by annular retaining wall 78 and configured to receive and retain the head portion 20 of filter assembly 10. Diametrically opposed arcuate retention ribs 82 and 84 project inwardly from retaining wall 78 to frictionally engage with corresponding ramped engagement struts 92 and 94 that project radially outwardly from the lower region of head portion 20 when the head portion 20 is rotatably engaged within the recessed seating area 76 during assembly. Stop surfaces 82a and 84a are associated with retention ribs 82 and 84, respectively, for limiting the movement of head portion 20 within seating area 76. In an alternate embodiment, the head portion 20 and support flange 70 may be adapted and configured to cooperate and engage with one another in a manner described hereinbelow with respect to filter assembly 800 and illustrated in FIGS. 52–53.

As best seen in FIGS. 1 and 2, the annular retaining wall 78 of support flange 70 is also configured to accommodate and support a shroud 90 which is configured to house and protect the rotary valve assembly 18 of filter assembly 10. As illustrated, the shroud 90 includes lateral apertures, i.e., aperture 92, for accommodating inlet and outlet conduits 12 and 14. Those skilled in the art will readily appreciate that the configuration of the shroud as well as the way in which it is joined to the support flange 70 could vary depending upon the nature of the operating environment within which the system is employed.

Referring to FIG. 5, in accordance with a preferred embodiment of the subject invention, cam lugs 62 and 64 are adapted and configured for reception within a pair of corresponding diametrically opposed reception areas 102 and 104 formed within the interior cavity 25 of valve member 26. Each of the lugs has engagement surfaces which face away from the body portion. At least one of the engagement surfaces defines a keyed surface formation including at least one tooth or protrusion axially extending from remaining portions of the engagement surfaces relative to the neck which enables the cartridge to mate with a compatible reception assembly. More particularly, the upper surface of each cam lug 62, 64 is provided with a unique key formation having, in this case, a plurality of spaced apart axially projecting teeth that are adapted and configured to engage and mate with a corresponding set of spaced apart recesses formed within the reception areas of the valve member 26. This mating arrangement is designed to ensure replacement cartridge compatibility by only permitting replacement of a filter cartridge having a keyed surface formation that corresponds with the surface features of the reception areas in the valve member.

In the exemplary embodiment of the invention illustrated in FIGS. 3–9, the key formation on each cam lug (62, 64) includes three spaced apart teeth (62a–62c, 64a–64c) and each reception area (102, 104) within the valve member 26 includes three corresponding recesses (102a–102c, 104a–104c) for accommodating the teeth when the neck portion 46 of cartridge 40 is received by valve member 26.

As discussed in greater detail hereinbelow, the number of teeth that define the key formation on each cam lug can vary within the scope of this invention (see for example FIGS. 18–40), as can the surface geometry of the key formation (see for example FIGS. 13–17). In each instance, the reception area in the rotary valve member would have a corresponding mating configuration to accommodate the key formation formed on the cam lugs. Furthermore, it is envisioned that the key configuration on one lug could be substantially similar to or different from the key configuration of the opposed lug. This will dramatically increase the number of possible key combinations available to a filter manufacturer.

Figure 10:
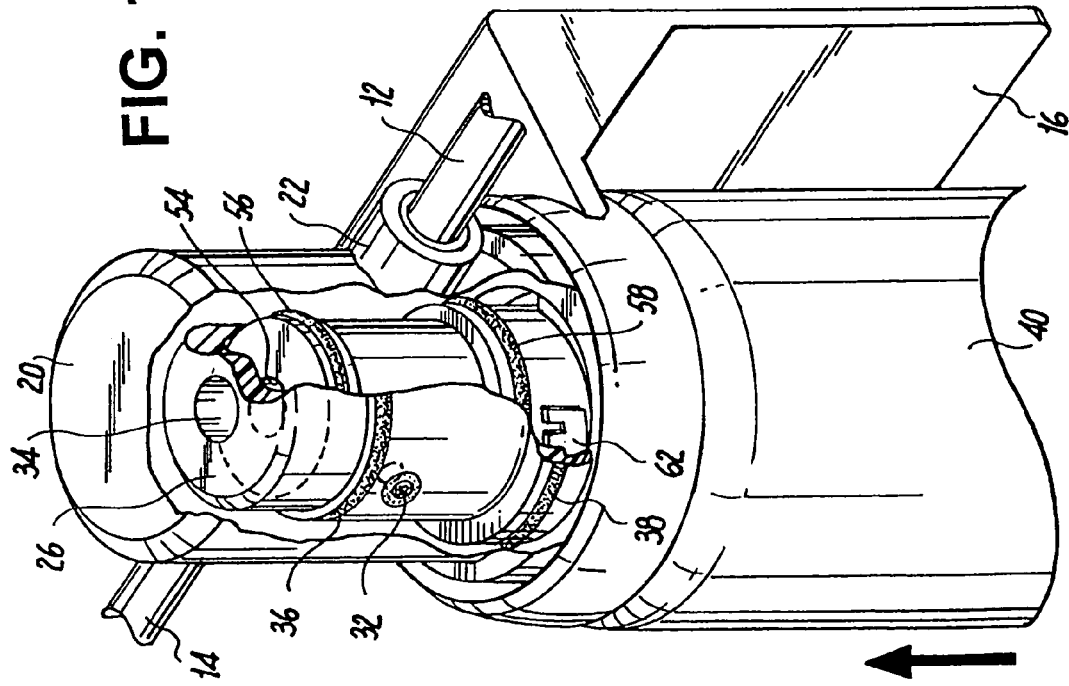
FIG. 10 is a perspective view of the upper portion of the filter assembly of the subject invention, with the wall of the head and valve members broken away to illustrate the initial position of the keyed camming lug of the filter relative to the ramped camming surface of the bracket member, wherein the valve assembly with which the head member is associated is closed to flow.

Referring to FIG. 10, when a compatible filter cartridge is introduced into the filter assembly 10 of the subject invention, the neck portion 46 of the filter cartridge 40 is inserted through the central aperture 75 of support flange 70, with the cam lugs 62 and 64 positioned between the diametrically opposed cam ramps 72 and 74. At such a time, the valve member 26 is in the "off" position to receive the neck portion 46. Thus, the inlet and outlet orifices 32, 34 of valve member 26 are not aligned with the inlet and outlet ports 42, 44 of head portion 20. Thereupon, the teeth (62a–62c, 64a–64c) forming the keyed engagement surface of cam lugs 62 and 64 extend into the corresponding recesses (102a–102c, 104a–104c) of recessed areas 102 and 104 and mate therewith.

Figure 11:
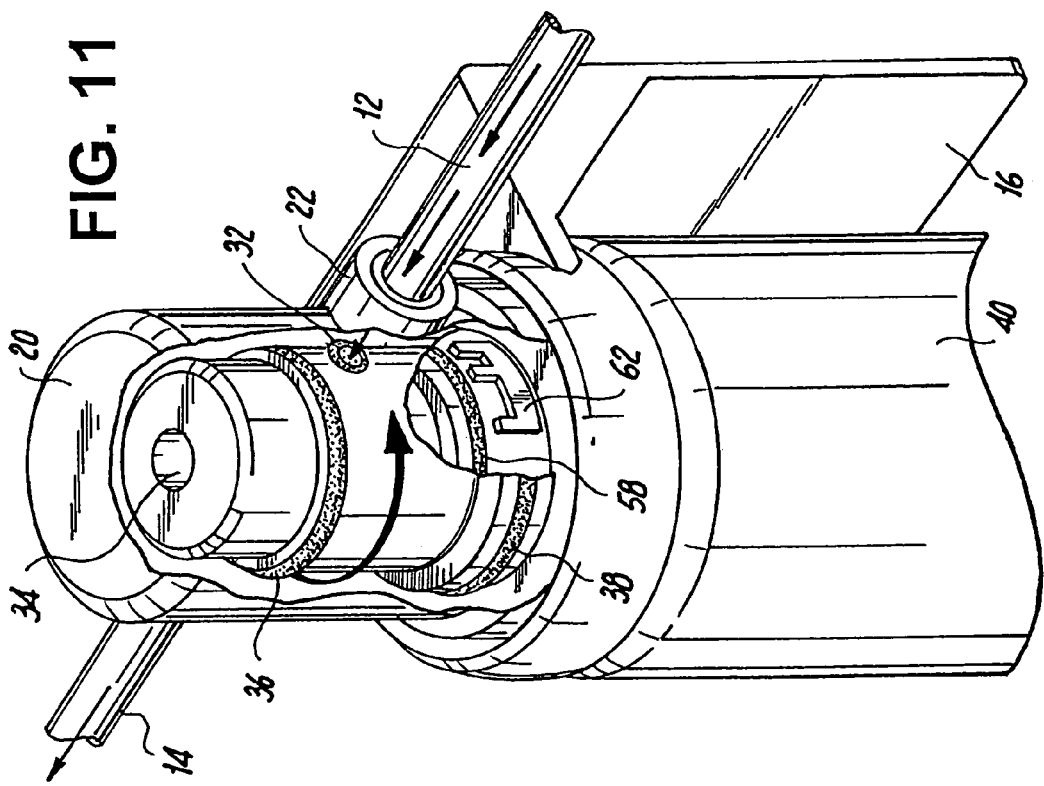
FIG. 11 is a perspective view of the upper portion of the filter assembly of the subject invention, with the wall of the head member broken away to illustrate the final position of the keyed camming lug of the filter relative to the ramped camming surface of the bracket member, wherein the valve assembly with which the head member is associated is open to flow.

Once the neck portion 46 of filter cartridge 40 has been intimately engaged within the interior chamber of valve member 26, the cartridge and valve member may rotated in a counter-clockwise direction with respect the support flange 70 and head portion 20, as illustrated in FIG. 11. Upon rotating filter cartridge 40 in conjunction with valve member 26, the cam lugs 62, 64 projecting from neck portion 46 translate against the cam ramps 72, 74, causing the filter cartridge 40 to move helically upwardly in an axial direction. As a result, valve member 26 is rotated into the "on" or open position, wherein the inlet and outlet orifices 32, 34 of the valve member 26 are aligned with the inlet and outlet ports 42, 44 of head portion 20 to allow fluid to flow through the filter assembly 10.

If the cam lugs of a replacement filter cartridge introduced into the system are not configured to mate with the reception areas of the valve member, i.e., if the cam lugs have no keyed surface formation, which may be indicative of an unauthorized after-market filter cartridge, the cam lugs will interfere with and be unable to engage the reception areas in the valve member. Consequently, because the inclined cam surfaces of the cam lugs 62, 64 will be located below the inclined surfaces of the cam ramps 72, 74, the cam lugs will be unable to traverse the cam ramps. As a result, the cam lugs will be unable to effect rotation of the valve member into the "on" position to permit fluid to flow through the assembly. This will ensure replacement cartridge compatibility by preventing the use of inferior or unauthorized replacement filter cartridges.

Figure 21:
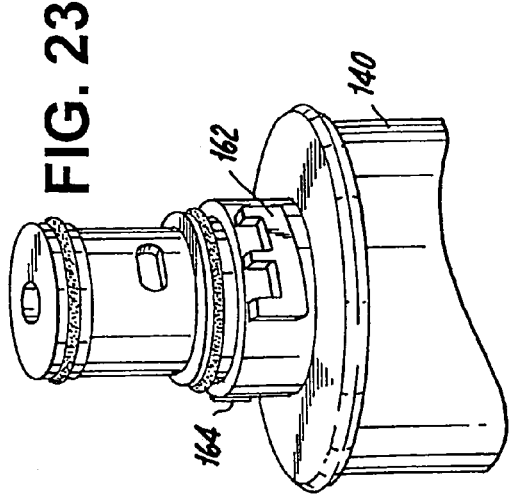
FIGS. 21–27 illustrate each of the available key patterns for a camming lug having a maximum of five teeth positions.
Figure 22:
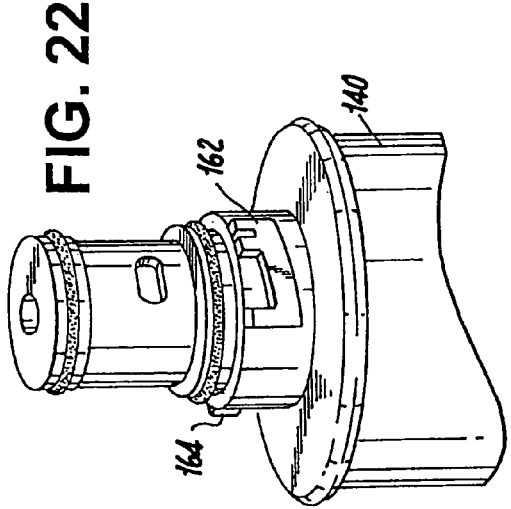
Figure 23:
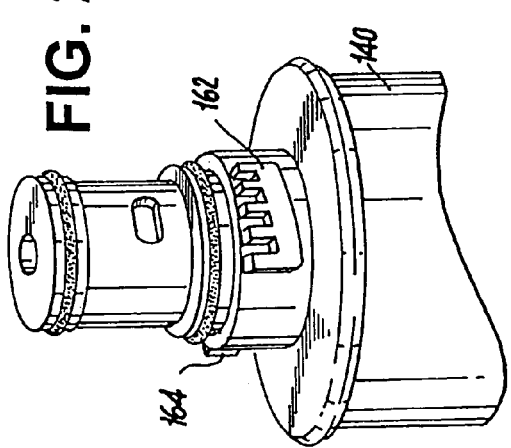
Figure 24:
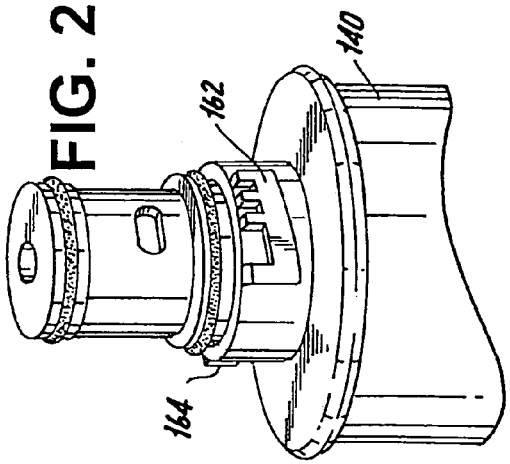
Figure 27:
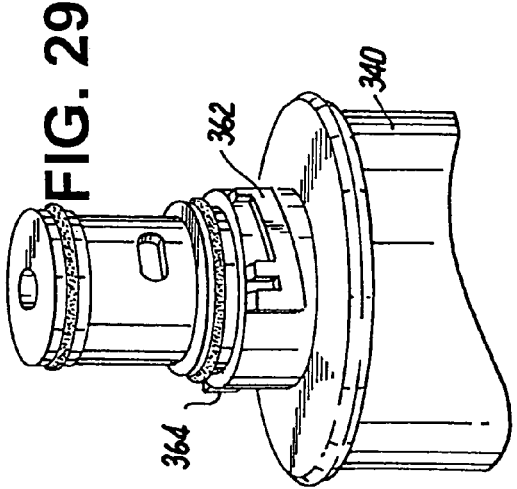
Figure 25:
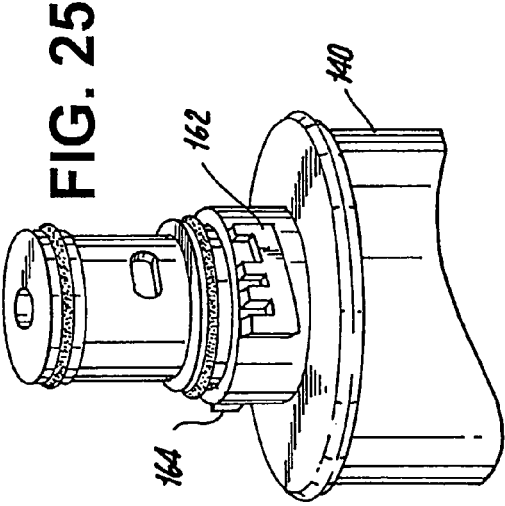
Figure 28:
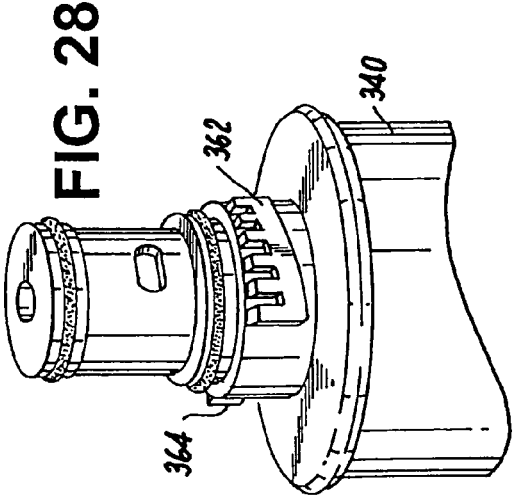
Figure 26:
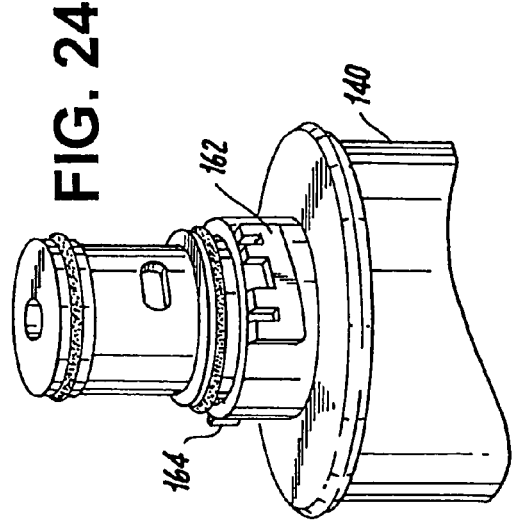
Figure 29:
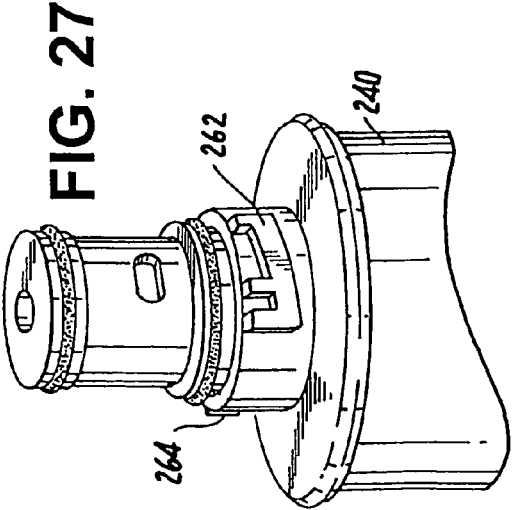
Figure 31:
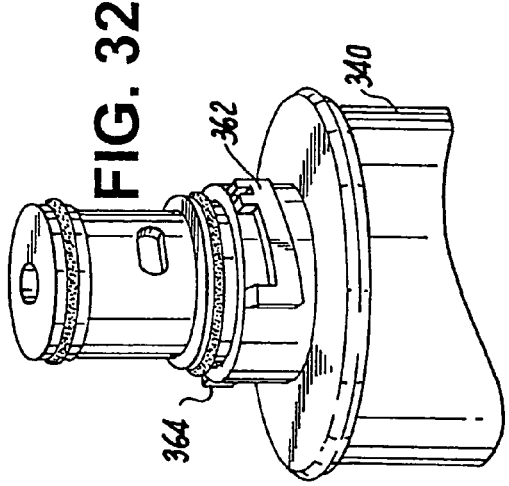
Figure 32:
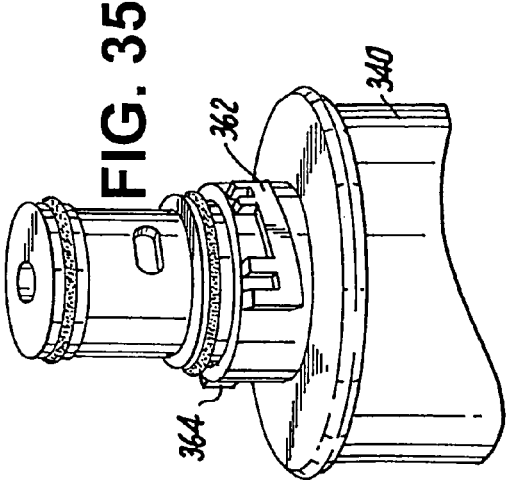
Figure 30:
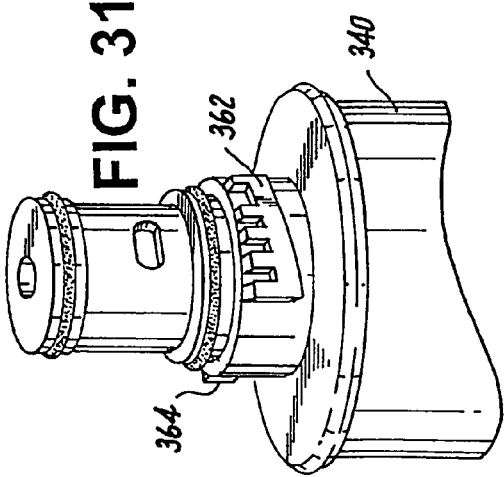
Figure 34:
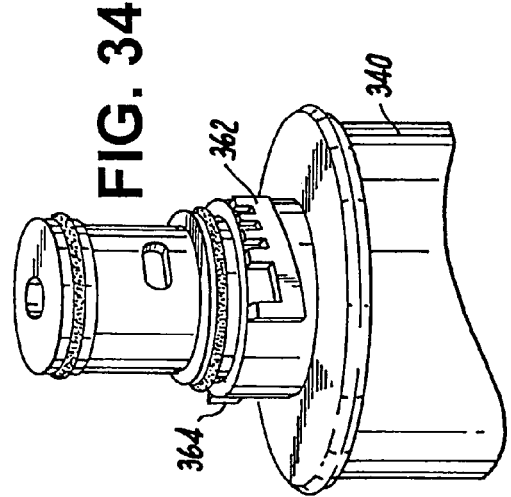
Figure 33:
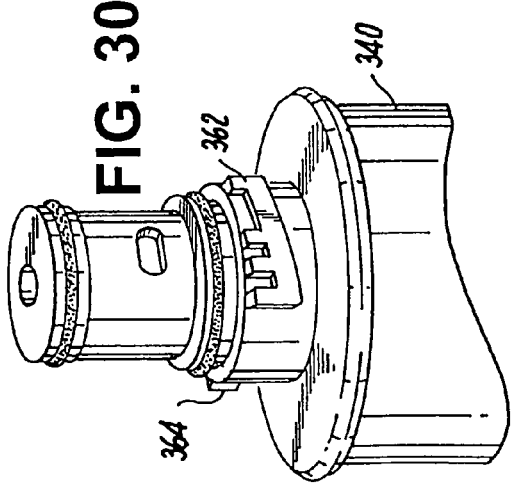
Figure 35:
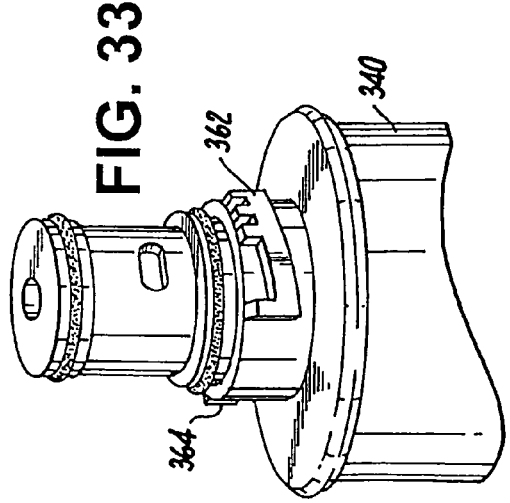
Figure 41:
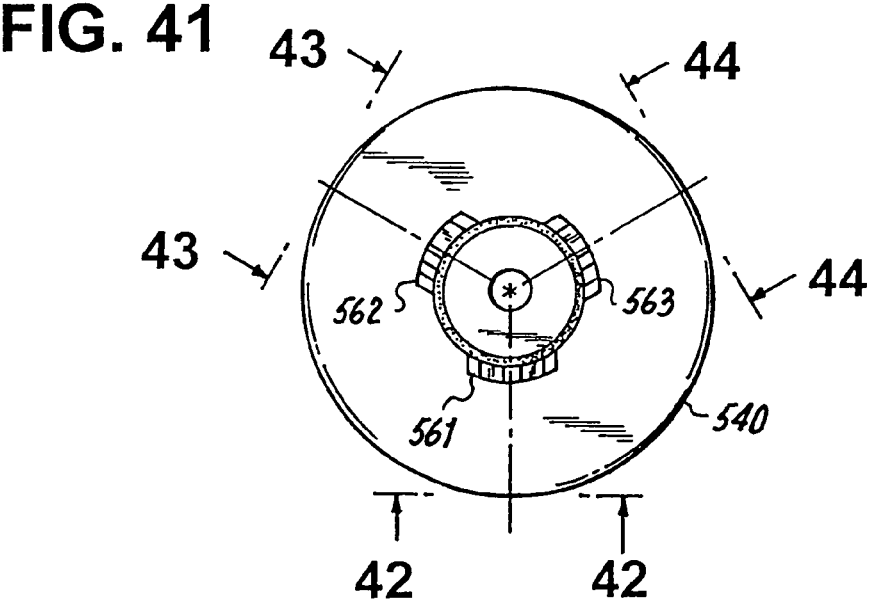
FIG. 41 is a top plan view of the neck portion of a filter cartridge constructed in accordance with a preferred embodiment of the subject invention which includes three circumferentially spaced camming lugs each having a different key formation thereon.

The key formation shown in the exemplary embodiment of FIGS. 3–11, corresponds to the key formation illustrated in FIG. 21, which is selected from a group of key formations having five available tooth positions. In the exemplary embodiment, the first, fourth and fifth teeth are present, while the second and third teeth are absent. Using the convention wherein the numeral "1" represents the presence of a tooth in a position of a key formation, and the numeral "0" represents the absence of a tooth in a position of the key formation, the key formation illustrated in FIGS. 3–11, and 21 may be represented by the numerical expression (1, 0, 0, 1, 1).

In accordance with a preferred embodiment of the subject invention, there exists a replacement cartridge that is provided with cam lugs having a surface formation that is compatible with a rotary valve member regardless of the number of recesses defined within the recessed areas formed therein. A cartridge having a neck portion with diametrically opposed cam lugs that include such a formation, referred to herein as a skeleton key formation, is illustrated in FIGS. 2 and 12 and is designated generally by reference numeral 140.

Figure 12:
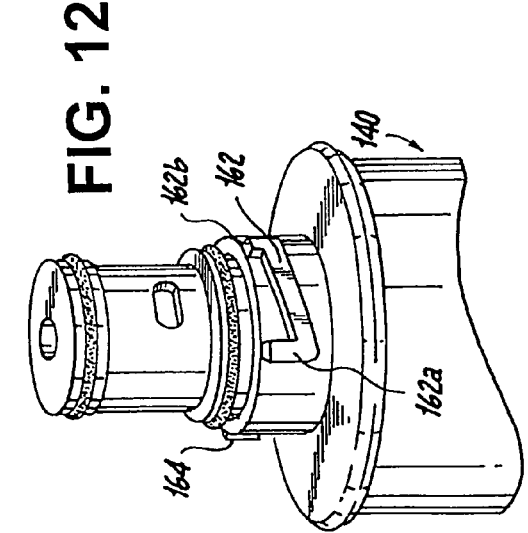
FIG. 12 is a perspective view of the cylindrical neck portion of the filter cartridge of the subject invention which includes camming lugs having a skeleton key formation.
Figure 13:
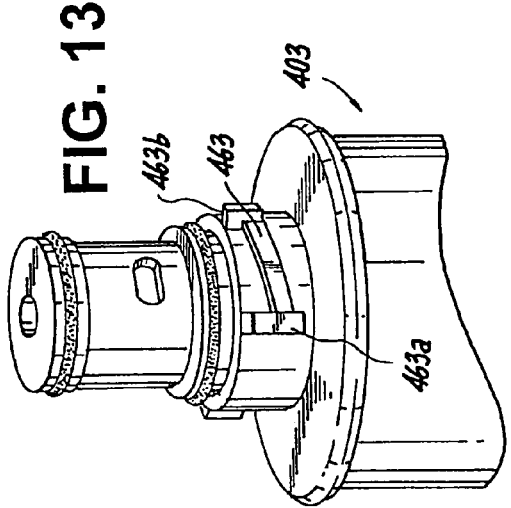
FIGS. 13–17 illustrate a variety of different key configurations provided on the camming lugs formed on the cylindrical neck portion of the filter cartridge of the subject invention.
Figure 14:
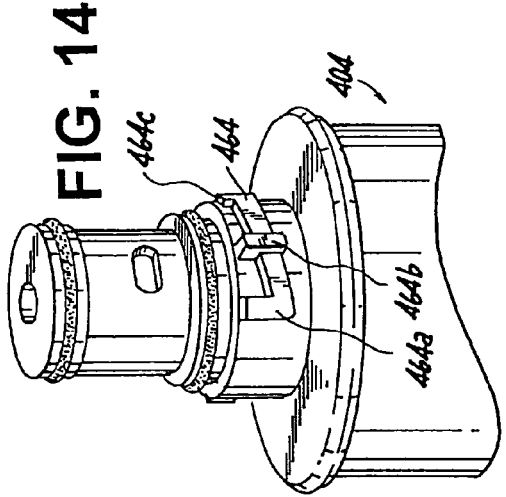

Referring to FIG. 12, the cam lugs 162 and 164 of filter cartridge 140 includes a skeleton key formation defined by a tooth formation wherein only the first and fifth tooth positions are filled with teeth (i.e., teeth 162a, 162b). This skeleton key is represented by the numerical expression (1, 0, 0, 0, 1). It should be understood that, in a five position key formation, the first and fifth position will always be filled, and, conversely, the recessed areas of the valve member will always have a recess located in the complementary positions.

Table 2 below, sets forth the available tooth combinations for the five position key formation associated with the opposed cam lugs 162 and 164 of filter cartridge 140 and illustrated in FIGS. 3–11 and 21–27. In total, excluding the skeleton key formation of FIG. 12, there are seven available tooth configurations for a five position key formation. Table 1 below sets forth the available tooth configurations for the four position key formation associated with the opposed cam lugs 262 and 264 of filter cartridge 240 illustrated in FIGS. 18–20. In total, excluding the skeleton key formation which is not shown and is represented by the numerical expression (1, 0, 0, 1) there are three available tooth configurations for a four position key formation. Table 3 sets forth the available tooth configurations for the six position key formation associated with the opposed cam lugs 362 and 364 of replaceable filter cartridge 340 as illustrated in FIGS. 28–41. In total, excluding the skeleton key formation which is not shown and is represented by the numerical expression (1, 0, 0, 0, 0, 1) there are fifteen available tooth configurations for a six position key formation.

TABLE 1

| Tooth Configurations (Four Positions) | FIG. |
|---|---|
| 1, 1, 1, 1 | 18 |
| 1, 1, 0, 1 | 19 |
| 1, 0, 1, 1 | 20 |

TABLE 2

| Tooth Configurations (5 positions) | FIG. |
|---|---|
| 1, 1, 1, 1, 1 | 21 |
| 1, 0, 0, 1, 1 | 22 |
| 1, 0, 1, 0, 1 | 23 |
| 1, 1, 0, 1, 1 | 24 |
| 1, 1, 1, 0, 1 | 25 |
| 1, 0, 1, 1, 1 | 26 |
| 1, 1, 0, 0, 1 | 27 |

TABLE 3

| Tooth Configurations (6 positions) | FIG. |
|---|---|
| 1, 1, 1, 1, 1, 1 | 28 |
| 1, 1, 0, 0, 0, 1 | 29 |
| 1, 1, 1, 0, 0, 1 | 30 |
| 1, 1, 1, 1, 0, 1 | 31 |
| 1, 0, 0, 0, 1, 1 | 32 |
| 1, 0, 0, 1, 1, 1 | 33 |
| 1, 0, 1, 1, 1, 1 | 34 |
| 1, 1, 0, 0, 1, 1 | 35 |
| 1, 1, 0, 1, 1, 1 | 36 |
| 1, 1, 1, 0, 1, 1 | 37 |
| 1, 0, 1, 1, 0, 1 | 38 |
| 1, 1, 0, 1, 0, 1 | 39 |
| 1, 0, 1, 0, 1, 1 | 40 |
| 1, 0, 1, 0, 0, 1 | not shown |
| 1, 0, 0, 1, 0, 1 | not shown |

In sum, the number of available tooth combinations "N" for a given tooth configuration having "n" tooth positions can be expressed mathematically as follows:

$$N = 2^{n-2} - 1$$

The relatively large number of key configuration that are available though the keyed system of the subject invention will give original equipment manufactures the ability to provide customized filters for each of their appliances. Thus, each manufacturer could offer a unique set of replacement filter cartridge, with each cartridge in the set having a different keyed surface formation provided on the camming lugs thereof, for mating with corresponding reception areas in a valve member supported within a particular type of appliance.

Figure 15:
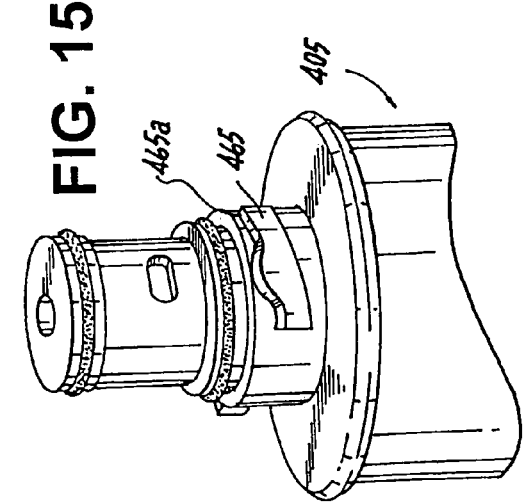
Figure 16:
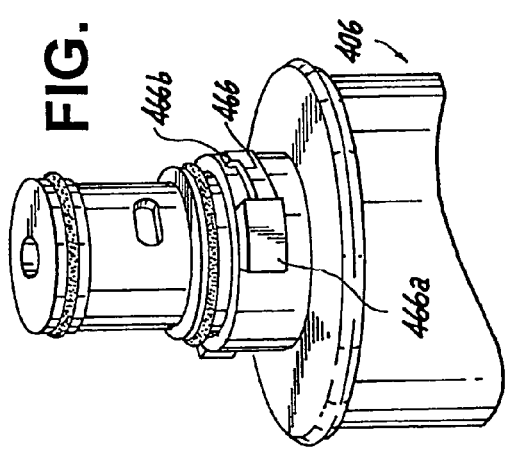
Figure 17:
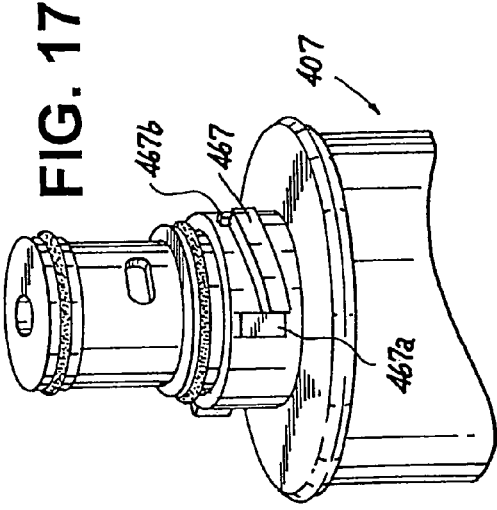
Figure 18:
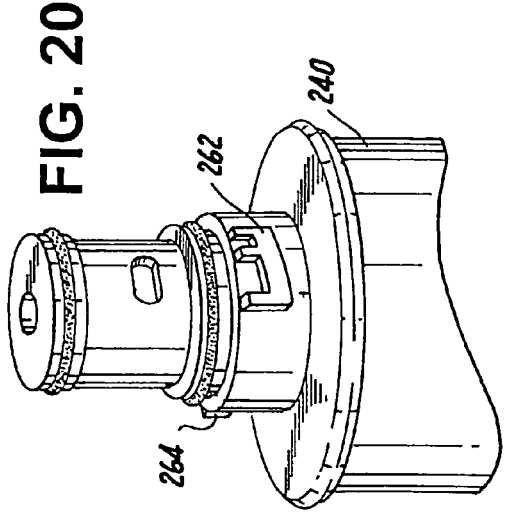
FIGS. 18–20 illustrate each of the available key patterns for a camming lug having a maximum of four teeth positions.
Figure 19:
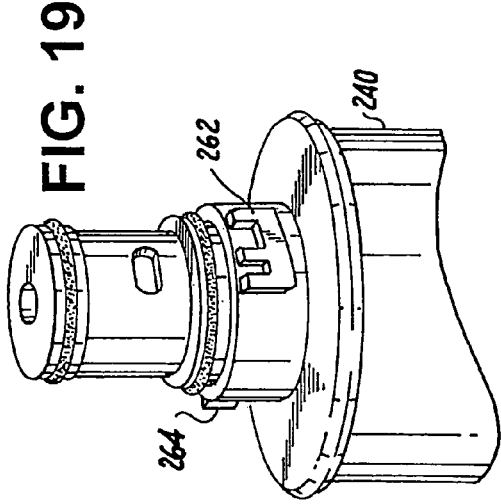
Figure 20:
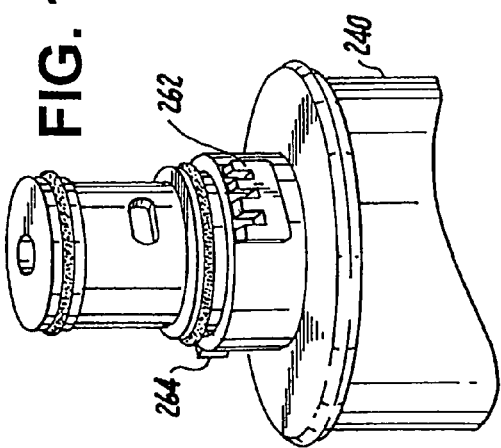

Referring to FIGS. 13–17, there are illustrated a series of replacement filter cartridges constructed in accordance with a preferred embodiment of the subject invention each having a different keyed surface formation associated therewith. For example, FIGS. 13, 14, 16 and 17 illustrate filter cartridges 403, 404, 406, and 407, respectively, with cam lugs 463, 464, 466 and 467 having keyed surface formations with portions that project both radially outwardly from the lugs as well as in an axial direction. For example, cam lug 463 in FIG. 13 includes two teeth 463a, 463b which project axially and radially from the lug. Cam lug 464 in FIG. 14 includes two axially projecting teeth 464a and 464c and one tooth 464b that projects both radially and axially. FIG. 16 illustrates a cam lug 466 having an enlarged radially and axially projecting tooth 466a and a smaller axially projecting tooth 466b. Cam lug 467 in FIG. 17 includes two axially projecting teeth 467a and 467b and the majority of the cam lug itself project radially outwardly from the neck portion of the filter cartridge 407. In accordance with the subject invention, it follows that a compatible rotary valve member would have recessed areas with mating features that correspond to the radially and axially extending keyed surface formations of cam lugs 463, 464, 466 and 467.

FIG. 15, illustrates another replacement filter cartridge 405 constructed in accordance with a preferred embodiment of the subject invention wherein the keyed surface formation provided on the cam lug 465 thereof is defined by a curved surface 465a. In accordance with the subject invention, a compatible valve member for filter cartridge 405 would have reception areas with a corresponding curved recesses to ensure compatibility with cartridge 405.

Figure 42:
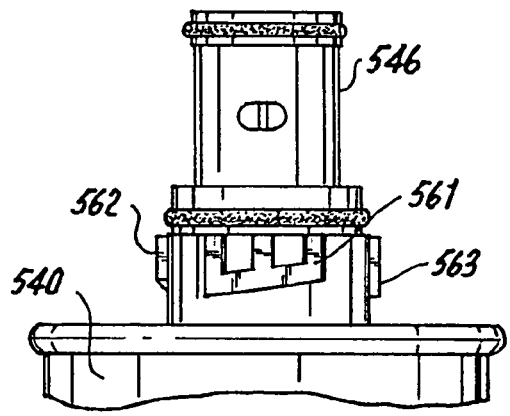
FIG. 42 is a side elevational view of the neck portion of the filter cartridge of FIG. 41, taken along line 42—42.
Figure 43:
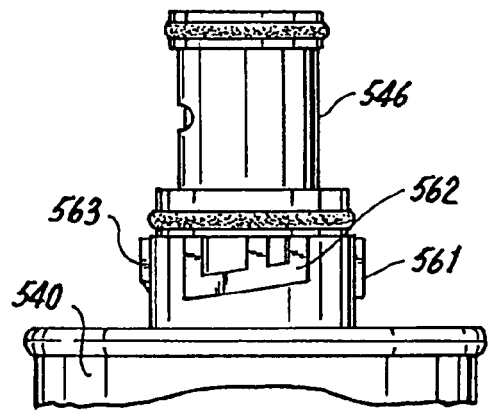
FIG. 43 is a side elevational view of the neck portion of the filter cartridge of FIG. 41, rotated 120° from the view shown in FIG. 42.
Figure 44:
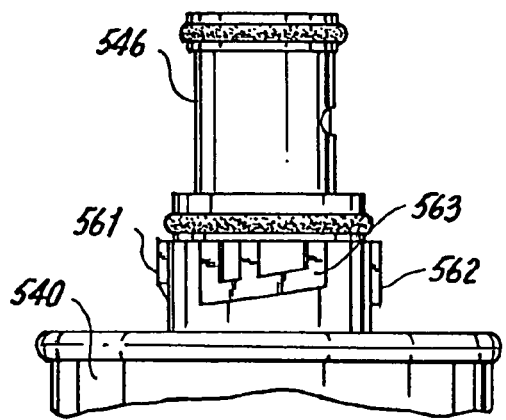
FIG. 44 is a side elevational view of the neck portion of the filter cartridge of FIG. 41, rotated 120° from the view shown in FIG. 43.

Referring to FIG. 41–44, there is illustrated another replacement filter cartridge constructed in accordance with a preferred embodiment of the subject invention and designated generally by reference numeral 540. Filter cartridge 540 includes three cam lugs 561, 562 and 563 that are circumferentially spaced apart about the periphery of neck portion 546. Each cam lug has a keyed surface formation thereon for mating with a corresponding recessed area of a compatible rotary valve member 26. As illustrated in FIGS. 42–44, the keyed surface formations of cam lugs 561–563 are derived from a five tooth configuration (see Table 2), and each cam lug has a different key pattern formed thereon. In particular, cam lug 561 has a first keyed surface formation that may be represented by the numerical expression (1, 0, 1, 0, 1), cam lug 562 has a second keyed surface formation that may be represented by the numerical expression (1, 0, 0, 1, 1), and cam lug 563 has a third keyed surface formation that may be represented by the numerical expression (1, 1, 0, 0, 1). It is also envisioned that cam lugs 561–563 could each have the same keyed surface formation provided thereon.

Referring to FIG. 45–49, there is illustrated another replacement filter cartridge constructed in accordance with a preferred embodiment of the subject invention and designated generally by reference numeral 640. Filter cartridge 640 includes two sets of diametrically opposed cam lugs that include cam lugs 661–664. The first set of opposed cam lugs 661, 663 are positioned at a first axial height on neck portion 646, and the second set of opposed cam lugs 662, 664 are positioned at a second axial height on neck portion 646. In addition, each cam lug has a keyed surface formation thereon for mating with a corresponding recessed area of a compatible rotary valve member 26. As illustrated in FIGS. 46–49, the keyed surface formations of cam lugs 661–664 are derived from a five tooth configuration (see Table 2). Cam lugs 661 and 664 have the same keyed surface formation thereon that may be represented by the numerical expression (1, 0, 0, 1, 1), while cam lugs 662 and 663 both have another keyed surface formation thereon that may be represented by the numerical expression (1, 1, 0, 0, 1). It is also envisioned that cam lugs 661–664 could each have the same keyed surface formation provided thereon, or, in the alternative, each cam lug could have a different keyed surface formation provided thereon.

Referring to FIGS. 50–51, there is illustrated another filter assembly constructed in accordance with a preferred embodiment of the subject invention and designated generally by reference numeral 700. Filter assembly 700 includes a head portion 720 enclosing a rotary valve member 726 that has a mechanism for minimizing leakage during cartridge replacement. The mechanism includes a floating check-ball 728 and an associated valve seat 730. As shown in FIG. 51, during normal service, when process fluid is flowing through the system, the outlet flow pressure of the filtered fluid causes the check-ball 728 to remain in an unseated position. In contrast, when the neck portion 46 of a replacement filter cartridge 40 is removed from the interior bore of valve member 726, and the outlet flow pressure is terminated, the check-ball 728 becomes seated in valve seat 730, as shown in FIG. 51. As a result, the void volume within head portion 720 is restricted from flowing out of valve member 726.

Figure 52:
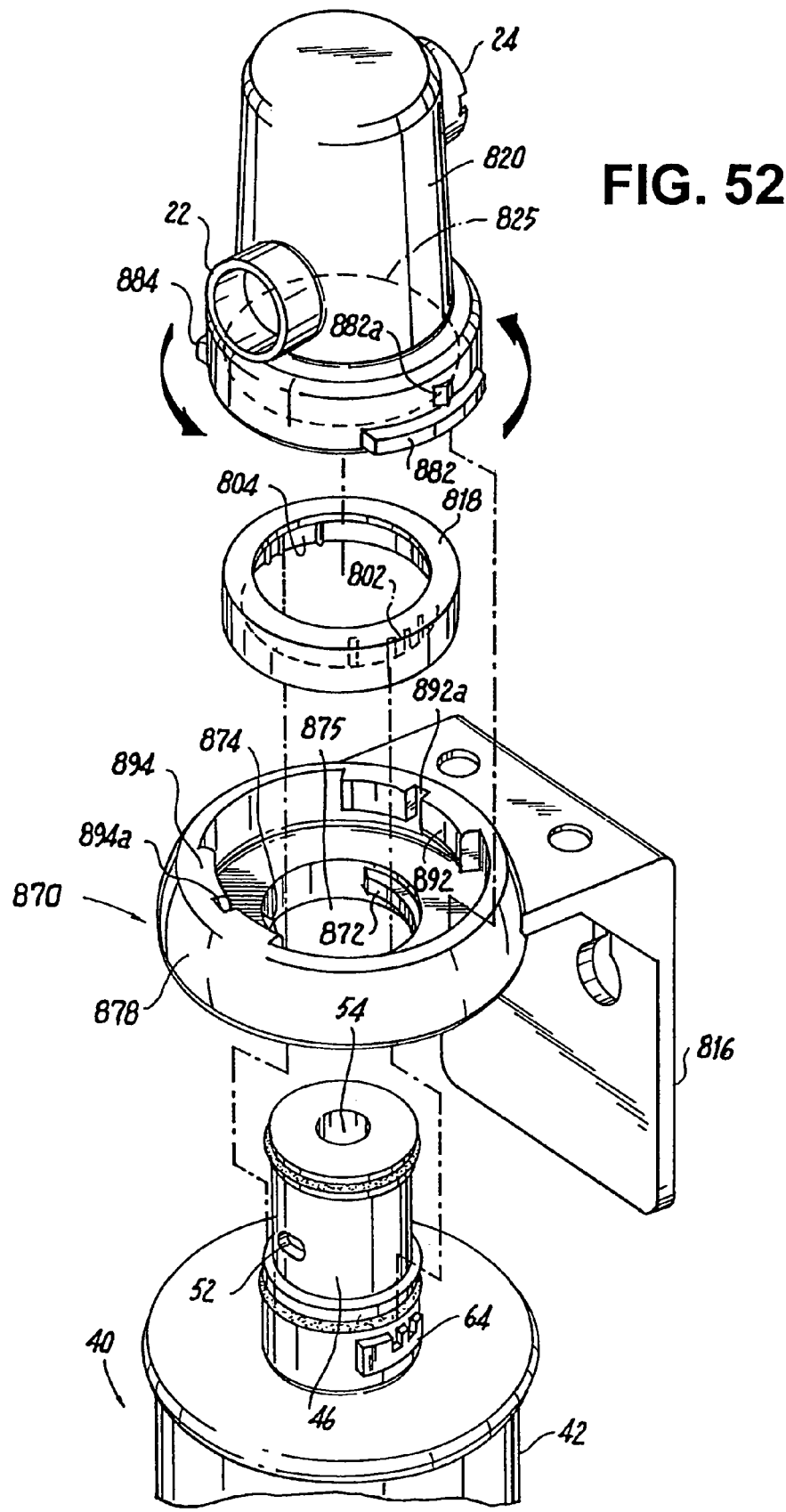
FIG. 52 is an exploded perspective view of another filter assembly constructed in accordance with a preferred embodiment of the subject invention with the parts thereof separated for ease of illustration, including an annular insert in the form of a key ring having recesses designed to mate with corresponding surface features on the keyed cam lugs of a replacement filter cartridge.
Figure 53:
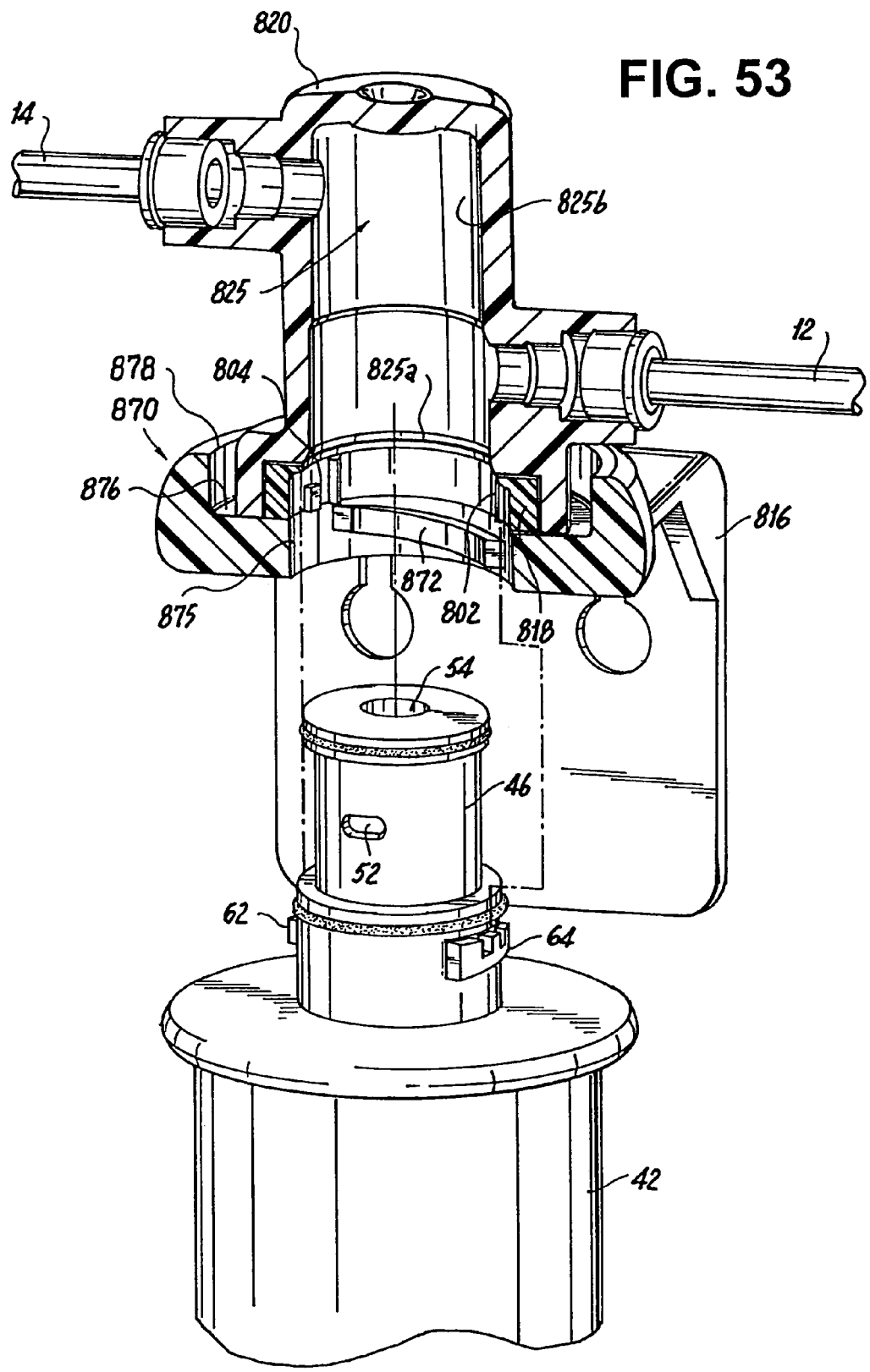
FIG. 53 is a perspective view of the filter assembly of the FIG. 52 with the head portion in cross-section to illustrate the interior structure thereof.

Referring now to FIGS. 52–53, there is illustrated another filter assembly constructed in accordance with a preferred embodiment of the subject invention and designated generally by reference numeral 800. Filter assembly 800 differs from the previously described embodiments of the subject invention in that the assembly does not include a rotary valve member, such as the valve member 18 of filter assembly 10. Instead, as best seen in FIG. 53, filter assembly 800 includes a head portion 820 with an interior bore 825 having a lower region 825a configured to support an annular insert in the form of a key ring 818. Key ring 818 defines diametrically opposed reception areas 802, 804 for mating with corresponding keyed surface formations on the cam lugs 62, 64 formed on the neck portion 26 of a replacement filter cartridge 40, for example. In accordance with the subject invention, to ensure the integrity of the system with which filter assembly 800 is associated, a compatible replacement cartridge must have cam lugs with keyed surface formations that mate with the recessed areas of the key ring 818.

Referring to FIG. 52, filter assembly 800 further includes a mounting bracket 816 having a support flange 870 depending therefrom for facilitating rotational engagement of a replacement filter cartridge 40 with head member 820 and the associated key ring 818. A central aperture 875 extends through support flange 870 to receive the neck 46 of filter cartridge 40, and a pair of diametrically opposed cam raps 872 and 874 project radially into central aperture 875 for operatively interacting with the inclined lower surfaces of cam lugs 62, 64 when filter cartridge 40 is engage with head portion 820.

Support flange 870 further includes a recessed seating area 876 defined by an annular retaining wall 878 configured to receive and retain the head portion 820. More particularly, head portion 820 includes a pair of diametrically opposed ramped cam struts 882 and 884 for operatively engaging a pair of diametrically opposed retention flanges 892 and 894 projecting radially inwardly from the retaining wall 878. In addition, ratchet nibs 882a and 884a project outwardly from the lower region of head portion 820 for engagement within corresponding notches 892a and 894a formed in retention flanges 892 and 894, respectively. Those skilled in the art will readily appreciate that the way in which head portion 820 and support flange 870 interact and engage may also be employed in conjunction with the filter assembly 10 described hereinabove, whereby head portion 20 and support flange 70 would be adapted and configured to interact and engage in a substantially similar manner.

To assemble the filter assembly 800 of the subject invention, a key ring 818 having particular configuration of recesses, which may be selected from a set of key rings each having different recess configurations, is first inserted into the lower region 825a of interior bore 825 of head potion 820. The head portion is then rotatably engaged within the seating area 876 of support flange 870. Thereafter, a filter cartridge 40 is brought into approximation with the head portion 820 by inserting the neck portion 46 of the cartridge through the central aperture 875 of support flange 870, allowing the camming lugs 62, 64 to pass between the opposed cam ramps 872, 874 projecting radially into aperture 875. At such a time, the keyed surface formations of the cam lugs 62, 64 mate with the corresponding recessed areas 802, 804 in key ring 818, provided of course that the cartridge and key ring are compatible with one another. Once the cam lugs 62, 64 are mated with the recessed areas 802, 804, the filter cartridge 40 is rotated through an arc of approximately 90°, such that the inclined lower surfaces of cam lugs 62, 64 translate relative to cam ramps 872, 874. This relative movement causes the key ring 818 to rotate within interior bore region 825a and causes the neck portion 46 of filter cartridge 40 to move axially into the upper region 825b of the interior bore 825 of head portion 820, until such time as the neck portion of the filter cartridge is sealingly received therein.

It should be noted that provision is made such that key ring 818 will rotate through a limited travel range relative to the head portion 820 as filter cartridge 40 is rotated into engagement with head portion 820. Furthermore, since a rotary valve member is not utilized with head portion 820, the upper region 825b of interior bore 825 is dimensioned and configured to directly mate with the neck portion 46 of filter cartridge 40, such that the inlet port 52 in neck portion 46 is in direct fluid communication with the radial inlet port 812 of head portion 820 and the axial outlet port 54 in neck portion 46 is in direct fluid communication with the radial outlet port 814 of head portion 820.

Although the disclosed fluid filtration apparatus has been described with respect to preferred embodiments, it is apparent that modifications and changes can be made thereto without departing from the spirit and scope of the invention as defined by the appended claims.

What is claimed is:

1. A filter cartridge comprising:
   a body portion for enclosing filter media for filtering a fluid; and
   a neck portion including an inlet port for directing unfiltered fluid into the body portion and an outlet port for directing filtered fluid out of the body portion, the body portion and the neck portion being operably connected such that one is not separable from the other, the neck portion having at least two lugs depending radially outwardly therefrom, each lug having engagement surfaces which face away from the body portion, wherein each lug has an inclined cam surface axially spaced from the body portion and facing toward the body portion in a generally axial direction for cooperating with camming ramps on a compatible reception assembly, at least one of the engagement surfaces defining a keyed surface formation comprising:

at least one tooth extending axially from remaining portions of the engagement surfaces relative to the neck, the at least one tooth enabling the cartridge to mate with a compatible reception assembly and preventing the cartridge from mating with an incompatible reception assembly.

2. A filter cartridge as recited in claim 1, wherein each lug has an engagement surface defining a keyed surface formation.

3. A filter cartridge as recited in claim 2, wherein the keyed surface formation on each lug of the cartridge is substantially similar.

4. A filter cartridge as recited in claim 2, wherein the keyed surface formation on each lug of the cartridge is different.

5. A filter cartridge as recited in claim 1, wherein the neck portion has a pair of diametrically opposed lugs.

6. A filter cartridge as recited in claim 1, wherein the neck portion has three circumferentially spaced apart lugs.

7. A filter cartridge as recited in claim 1, wherein the neck portion has first and second pairs of diametrically opposed lugs, wherein the first pair of lugs is disposed at a first height on the neck portion and the second pair of lugs is disposed at a second height on the neck portion.

8. A filter cartridge as recited in claim 1, wherein the keyed surface formation is on an axially facing engagement surface of the lug.

9. A filter cartridge as recited in claim 1, wherein the keyed surface formation is on a radially facing engagement surface of the lug.

10. A filter cartridge as recited in claim 1, wherein at least a first portion of the keyed surface formation is on an axially facing engagement surface of the lug and at least a second portion of the keyed surface formation is on a radially facing engagement surface of the lug.

11. A filter cartridge comprising:
a body portion for enclosing filter media for filtering a fluid; and
a neck portion including an inlet port for directing unfiltered fluid into the body portion and an outlet port for directing filtered fluid out of the body portion, the body portion and the neck portion being operably connected such that one is not separable from the other, the neck portion having at least two lugs depending radially outwardly therefrom, each lug having radial and axial engagement surfaces facing away from the body portion, wherein each lug has an inclined cam surface axially spaced from the body portion and facing toward the body portion in a generally axial direction for cooperating with camming ramps on a compatible reception assembly, at least one of the engagement surfaces defining a keyed surface formation comprising:

at least one protrusion extending axially from remaining portions of the engagement surfaces relative to the neck, the at least one protrusion enabling the cartridge to mate with a compatible reception assembly and preventing the cartridge from mating with an incompatible reception assembly.

12. A filter cartridge as recited in claim 11, wherein each lug has an engagement surface defining a keyed surface formation.

13. A filter cartridge as recited in claim 12, wherein the keyed surface formation on each lug of the cartridge is substantially similar.

14. A filter cartridge as recited in claim 12, wherein the keyed surface formation on each lug of the cartridge is different.

15. A filter cartridge as recited in claim 11, wherein the neck portion has a pair of diametrically opposed lugs.

16. A filter cartridge as recited in claim 11, wherein the neck portion has three circumferentially spaced apart lugs.

17. A filter cartridge as recited in claim 11, wherein the neck portion has first and second pairs of diametrically opposed lugs, wherein the first pair of lugs is disposed at a first height on the neck portion and the second pair of lugs is disposed at a second height on the neck portion.

18. A filter cartridge as recited in claim 11, wherein the keyed surface formation is on the axial engagement surface of the lug.

19. A filter cartridge as recited in claim 11, wherein the keyed surface formation is on the radial engagement surface of the lug.

20. A filter cartridge as recited in claim 11, wherein at least a first portion of the keyed surface formation is on the axial engagement surface of the lug and at least a second portion of the keyed surface formation is on the radial engagement surface of the lug.

* * * * *

UNITED STATES PATENT AND TRADEMARK OFFICE
CERTIFICATE OF CORRECTION

| | | |
|---|---|---|
| PATENT NO. | : 7,135,113 B2 | Page 1 of 1 |
| APPLICATION NO. | : 10/753894 | |
| DATED | : November 14, 2006 | |
| INVENTOR(S) | : Laurence W. Bassett | |

It is certified that error appears in the above-identified patent and that said Letters Patent is hereby corrected as shown below:

Column 1, line 2 –
  Beneath "KEYED FILTER ASSEMBLY" insert --CROSS-REFERENCE TO RELATED APPLICATIONS--.

Column 6, line 6 –
  Delete "FIG. 3" and insert --FIGS. 2 and 3--.

Column 6, line 8 –
  After "media" insert --45--.

Column 6, line 12 –
  Delete "media." and insert --media which is shown for example in FIG. 2.--

Signed and Sealed this

Twenty-seventh Day of March, 2007

JON W. DUDAS
*Director of the United States Patent and Trademark Office*